United States Patent
Fischer et al.

(10) Patent No.: US 10,727,473 B2
(45) Date of Patent: Jul. 28, 2020

(54) ELECTROCHEMICAL CELL AND METHOD OF MAKING THE SAME

(71) Applicant: Viking Power Systems Pte. Ltd., Singapore (SG)

(72) Inventors: Christopher Carl Fischer, Concord, MA (US); Robert Ellis Doe, Medfield, MA (US); David Eaglesham, Lexington, MA (US); Matthew Joseph Trahan, Franklin, MA (US); Andrew Gmitter, Lansdale, PA (US)

(73) Assignee: Viking Power Systems Pte. Ltd., Singapore (SG)

( * ) Notice: Subject to any disclaimer, the term of this patent is extended or adjusted under 35 U.S.C. 154(b) by 0 days.

(21) Appl. No.: 15/839,638

(22) Filed: Dec. 12, 2017

(65) Prior Publication Data

US 2018/0102531 A1 Apr. 12, 2018

Related U.S. Application Data

(63) Continuation of application No. 14/966,100, filed on Dec. 11, 2015, now Pat. No. 9,887,415.

(Continued)

(51) Int. Cl.
*H01M 4/04* (2006.01)
*H01M 4/38* (2006.01)
(Continued)

(52) U.S. Cl.
CPC ....... *H01M 4/0452* (2013.01); *H01M 4/0445* (2013.01); *H01M 4/134* (2013.01);
(Continued)

(58) Field of Classification Search
CPC .......... H01M 4/0452; H01M 10/0568; H01M 10/42; H01M 10/054; H01M 4/381;
(Continued)

(56) References Cited

U.S. PATENT DOCUMENTS

| | | |
|---|---|---|
| 5,314,765 A | 5/1994 | Bates |
| 5,422,203 A | 6/1995 | Guyomard et al. |

(Continued)

FOREIGN PATENT DOCUMENTS

| | | |
|---|---|---|
| CN | 104094452 A | 5/2014 |
| EP | 2528152 A1 | 11/2012 |

(Continued)

OTHER PUBLICATIONS

USPTO; Non-Final Office Action dated Mar. 29, 2017 in U.S. Appl. No. 14/966,100.

(Continued)

*Primary Examiner* — Stewart A Fraser
(74) *Attorney, Agent, or Firm* — Downs Rachlin Martin PLLC

(57) ABSTRACT

A secondary cell comprising a positive cathode electrode of capacity P (mAh) in communication with a liquid or gel electrolyte; an negative anode electrode of capacity N (mAh) in communication with the electrolyte; and a separator permeable to at least one mobile species which is redox-active at least one of the anode and the cathode; designed and constructed such that the anode capacity N is smaller than that of the cathode capacity P, hence N/P<0.9.

20 Claims, 9 Drawing Sheets

Related U.S. Application Data

(60) Provisional application No. 62/091,413, filed on Dec. 12, 2014.

(51) Int. Cl.

| | | |
|---|---|---|
| *H01M 10/052* | (2010.01) | |
| *H01M 4/1395* | (2010.01) | |
| *H01M 10/054* | (2010.01) | |
| *H01M 10/0568* | (2010.01) | |
| *H01M 10/42* | (2006.01) | |
| *H01M 4/134* | (2010.01) | |
| *H01M 4/02* | (2006.01) | |

(52) U.S. Cl.
CPC ......... *H01M 4/1395* (2013.01); *H01M 4/381* (2013.01); *H01M 4/382* (2013.01); *H01M 10/052* (2013.01); *H01M 10/054* (2013.01); *H01M 10/0568* (2013.01); *H01M 10/42* (2013.01); *H01M 2004/021* (2013.01); *H01M 2004/027* (2013.01); *H01M 2010/4292* (2013.01); *H01M 2300/0025* (2013.01); *Y02T 10/7011* (2013.01)

(58) Field of Classification Search
CPC .... H01M 4/134; H01M 4/382; H01M 4/1395; H01M 10/052
See application file for complete search history.

(56) References Cited

U.S. PATENT DOCUMENTS

| | | | |
|---|---|---|---|
| 5,601,951 A | 2/1997 | Johnson | |
| 5,620,811 A | 4/1997 | Zhang et al. | |
| 6,168,884 B1 | 1/2001 | Neudecker et al. | |
| 6,258,478 B1 | 7/2001 | Kim | |
| 6,402,795 B1 | 6/2002 | Chu et al. | |
| 6,706,447 B2 | 3/2004 | Gao et al. | |
| 7,524,579 B1 | 4/2009 | Jow et al. | |
| 7,776,465 B1 | 8/2010 | Hatazawa et al. | |
| 7,883,797 B2 | 2/2011 | Kishi et al. | |
| 8,460,808 B2 | 6/2013 | Toia et al. | |
| 8,597,833 B2 | 12/2013 | Hwang | |
| 8,715,865 B2 | 5/2014 | Xu et al. | |
| 8,728,670 B2 | 5/2014 | Inagaki et al. | |
| 8,834,180 B2 | 9/2014 | Woo et al. | |
| 8,865,350 B2 | 10/2014 | Yamada et al. | |
| 9,114,382 B2 | 8/2015 | Visconti et al. | |
| 9,160,036 B2 | 10/2015 | Yang et al. | |
| 9,887,415 B2* | 2/2018 | Fischer ............... | H01M 4/0452 |
| 2001/0008728 A1 | 7/2001 | Turner | |
| 2003/0076074 A1 | 4/2003 | Kawai | |
| 2004/0021442 A1 | 2/2004 | Higashino | |
| 2006/0251968 A1 | 11/2006 | Tsukamoto | |
| 2007/0166617 A1* | 7/2007 | Gozdz ................... | H01M 4/133 |
| | | | 429/231.95 |
| 2007/0231707 A1 | 10/2007 | Abe et al. | |
| 2008/0026297 A1 | 1/2008 | Chen et al. | |
| 2008/0118845 A1 | 5/2008 | Ihara | |
| 2008/0182172 A1 | 7/2008 | Takamuku | |
| 2009/0008031 A1 | 1/2009 | Gould | |
| 2009/0035662 A1 | 2/2009 | Scott et al. | |
| 2011/0006738 A1 | 1/2011 | Mikhaylik et al. | |
| 2011/0076556 A1 | 3/2011 | Karthikeyan | |
| 2011/0081577 A1 | 4/2011 | Gozdz | |
| 2011/0104574 A1 | 5/2011 | Shembel et al. | |
| 2013/0059178 A1 | 3/2013 | Ihara et al. | |
| 2013/0157147 A1 | 6/2013 | Li | |
| 2013/0164584 A1 | 6/2013 | Scott | |
| 2013/0171514 A1 | 7/2013 | Mio et al. | |
| 2013/0202956 A1 | 8/2013 | Xu | |
| 2014/0038053 A1 | 2/2014 | Endo | |
| 2014/0120409 A1 | 5/2014 | Ouchi | |
| 2015/0030937 A1 | 1/2015 | Shembel et al. | |
| 2015/0050543 A1 | 2/2015 | Christensen et al. | |
| 2015/0311516 A1 | 10/2015 | Chen | |
| 2016/0006081 A1 | 1/2016 | Eaglesham et al. | |
| 2016/0079626 A1 | 3/2016 | Bae et al. | |
| 2016/0126592 A1 | 5/2016 | Saito | |
| 2016/0172660 A1 | 6/2016 | Fischer et al. | |
| 2016/0172661 A1 | 6/2016 | Fischer et al. | |
| 2016/0172711 A1 | 6/2016 | Yang et al. | |
| 2016/0197376 A1* | 7/2016 | Koshiba ............... | H01M 4/5825 |
| | | | 429/188 |
| 2016/0204432 A1* | 7/2016 | Koshiba ............... | H01M 4/5825 |
| | | | 429/331 |
| 2016/0261000 A1 | 9/2016 | Zhang et al. | |
| 2016/0344063 A1 | 11/2016 | Chang et al. | |
| 2017/0033406 A1 | 2/2017 | Zhang et al. | |
| 2018/0102531 A1 | 4/2018 | Fischer | |
| 2018/0102532 A1 | 4/2018 | Fischer et al. | |
| 2019/0036179 A1 | 1/2019 | Downie et al. | |
| 2019/0036180 A1 | 1/2019 | Downie et al. | |

FOREIGN PATENT DOCUMENTS

| | | |
|---|---|---|
| EP | 2660906 A1 | 6/2013 |
| EP | 2768064 A1 | 8/2014 |
| JP | H09259929 A | 10/1997 |
| JP | 2001023697 A | 8/2002 |
| JP | 2004227931 A | 2/2006 |
| JP | 2008084706 A | 10/2009 |
| JP | 2014515546 A | 6/2014 |
| WO | 2015033619 | 12/2015 |
| WO | 2016094750 A1 | 6/2016 |

OTHER PUBLICATIONS

USPTO; Final Office Action dated Jul. 20, 2017 in U.S. Appl. No. 14/966,100.
USPTO; Notice of Allowance dated Oct. 19, 2017 in U.S. Appl. No. 14/966,100.
PCT; International Search Report and Written Opinion dated Nov. 26, 2018 in Application No. PCT/US2018/044429.
PCT; International Search Report dated Mar. 18, 2019 in Application No. PCT/US2018/066557.
PCT; Written Opinion dated Mar. 18, 2019 in Application No. PCT/US2018/066557.
Aurbach et al., "Prototype Systems for Rechargeable Magnesium Batteries," Nature, vol. 407(6805), pp. 724-727, (2000).
Aurbach et al., "Nonaqueous Magnesium Electrochemistry and its Application in Secondary Batteries," The Chemical Record, vol. 3, pp. 61-73, (2003).
Brandt, "Historical Development of Secondary Lithium Batteries," Solid State Ionics, vol. 69(3-4), pp. 173-183, (1994).
Chalasani et al., "Methylene Ethylene Carbonate: Novel Additive to Improve the High Temperature Performance of Lithium Ion Batteries," Journal of Power of Sources, vol. 208, pp. 67-73, (2012).
Dahn, "Electrically Rechargeable Metal-Air Batteries Compared to Advanced Lithium-Ion Batteries," presented at IBM Almadan Institute, (2009).
Harry et al., "Detection of Subsurface Structures Underneath Dendrites Formed on Cycled Lithium Metal Electrodes," Nature Materials, vol. 13, pp. 69-73, (2014).
Gallagher et al., "Manufacturing Costs of Batteries for Electric Vehicles," Lithium-Ion Batteries: Advances and Applications, Chapter 6, pp. 97-126, (2014).
Li et al., "A Review of Lithium Deposition in Lithium-Ion and Lithium Metal Secondary Batteries," Journal of Power of Sources, vol. 254, pp. 168-182, (2014).
Liu et al., "Rechargeable Mg-Ion Batteries Based on WSe2 Nanowire Cathodes," ACS Nano, vol. 7(9), pp. 8051-8058, (2013).
Matsui, "Study on Electrochemically Deposited Mg Metal," Journal of Power Sources, vol. 196(16), pp. 7048-7055, (2011).
Mikhaylik, "Protection of Li Anodes Using Dual Phase Electrolytes," Sion Power, DoE EERE Report, 8 Pages, (2011).
Nguyen et al., "Improved Cycling Performance of SI Nanoparticle Anodes via Incorporation of Methylene Ethylene Carbonate," Electrochemistry Communications, vol. 66, pp. 71-74, (2016).

(56) References Cited

OTHER PUBLICATIONS

Park et al., "A Highly Reversible Lithium Metal Anode," Nature Scientific Reports, vol. 4, Report No. 3815, 8 Pages, (2014).
Von Sacken et al., "Comparative Thermal Stability of Carbon Intercalation Anodes and Lithium Metal Anodes for Rechargeable Lithium Batteries," Journal of Power Sources, vol. 54(2), pp. 240-245, (1995).
Vaughey et al., "Lithium Metal Anodes," Annual Merit Review, DOE Vehicle Technologies Program, 31 Pages, (2009).
Zheng et al., "Magnesium Cobalt Silicate Materials for Reversible Magnesium Ion Storage," Electrochimica Acta, vol. 66, pp. 75-81, (2012).
Ha, Se-Young, et al; Magnesium (II) Bis(trifluoromethane sulfonyl) Imide-Based Electrolytes with Wide Electrochemical Windows for Rechargeable Magnesium Batteries; ACS Publications; Published on Feb. 21, 2014; pp. 4063-4073.
International Search Report and Written Opinion dated Mar. 17, 2016, in Appl. No. PCT/US15/65153 filed Dec. 11, 2015.
Grebel et al. "Towards bi-carrier ion-transistors: DC and optically induced effects in electrically controlled electrochemical cell", Electrochemical Acta, 95:308-312; Apr. 2013.
International Search Report and Written Opinion dated Nov. 2, 2017, in App. No. PCT/US2017/046685 filed Aug. 14, 2017.
Campion, C. L et al., Suppression of Toxic Compounds Produced in the Decomposition of Lithium-Ion Battery Electrolytes, Electrochemical and Solid-State Letters, vol. 7, pp. A194-A197; May 12, 2004.
Xu, Kang; Nonaqueous Liquid Electrolytes for Lithium-Based Rechargeable Batteries; Chem. Rev. 2004, 104, 4303-4417; published Sep. 16, 2004.
Winter, M.; Blends of lithium bis(oxalate)borate and lithium tetrafluoroborate: useful substitutes for lithium difluoro (oxalato)borate in electrolytes for lithium metal based secondary batteries; Electrochmica Acta, 2013, 107, 26-32; available online Jan. 10, 2013.
Wu, F.; A diisocyanate/sulfone binary electrolyte based on lithium difluoro(oxalate)borate for lithium batteries; Mater. Chem. A, 2013, 1, 3659; Jan. 10, 2013.
Xu, et al., "Lithium metal anodes for rechargeable batteries", Energy & Environmental Science, vol. 7, Oct. 29, 2013, p. 513-537.
Wang, D. Y., et al., A systematic study of well-known electrolyte additives in LiCoOx/graphite pouch cells, Journal Power Sources 251 (2014) 311-318; Available online Dec. 3, 2013.
Huang, W., et al., 4-(Trifluoromethyl)-benzontrile: A novel electrolyte additive for lithium nickel manganese oxide cathod of high voltage lithium ion battery, Journal of Power Sources 267 (2014) 560-565; Available online Jun. 4, 2014.
Dahn J.R. et al.; Ternary and Quaternary Electrolyte Additive Mixtures for Li-ion Cells that Promote Long Lifetime, High Discharge Rate, and Better Safety, JES, 2014, Vo. 161, pp. A1261-A1265; Published Jun. 7, 2014.
Petibon, R., et al., Study of the Consumption of Vinylene Carbonate in Li(Ni0.33MN0.33Co0.33)O2/Graphite Pouch Cells, Journal of the Electrochemical Society, 161 (10) A1618-A1624 (Jul. 11, 2014.
Wu, et al., "Ionic liquid-based electrolyte with binary lithium salts for high performance lithium-sulfur batteries", Journal of Power Sources, vol. 296, Jul. 18, 2015; p. 10-17.

\* cited by examiner

FIG. 1A
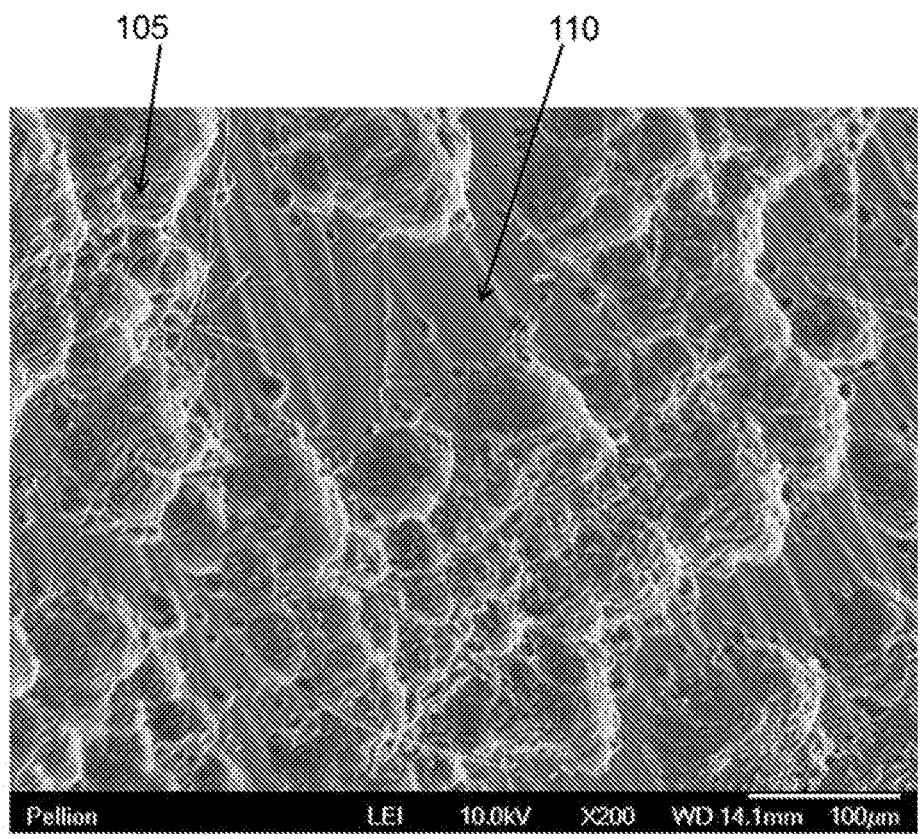
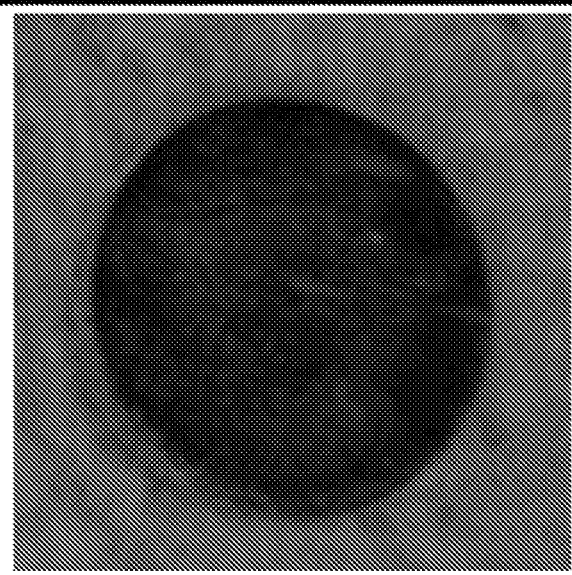
FIG. 1B

FIG. 2A
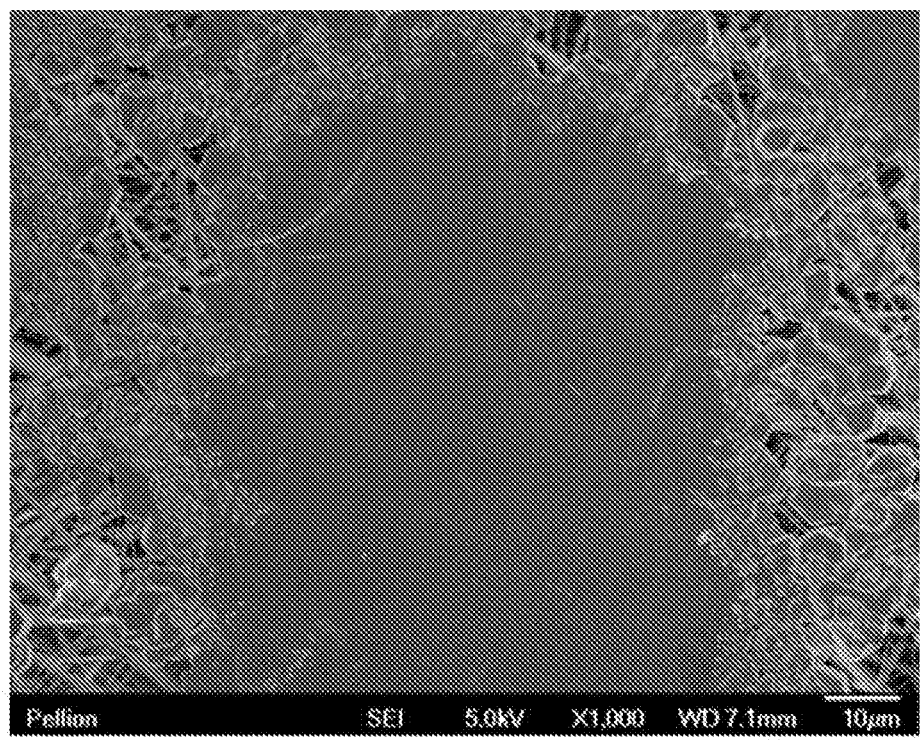
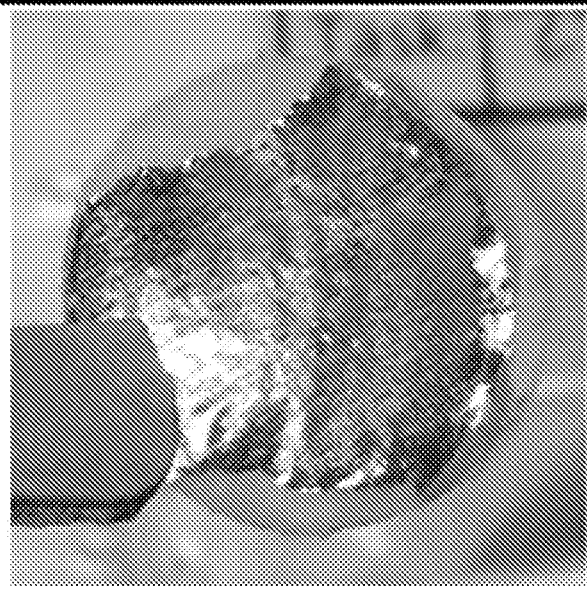
FIG. 2B

ELECTROCHEMICAL CELL AND METHOD OF MAKING THE SAME

CROSS-REFERENCE TO RELATED APPLICATIONS

This application is a continuation of, and claims priority to U.S. patent application Ser. No. 14/966,100, filed on Dec. 11, 2015, which claims priority to and the benefit of U.S. Provisional Patent Application Ser. No. 62/091,413, filed Dec. 12, 2014, the disclosures of which are incorporated herein by reference to the extent they do not conflict with the present disclosure.

FIELD OF THE INVENTION

The invention relates to electrochemical cells in general and particularly to secondary electrochemical cells.

BACKGROUND OF THE INVENTION

Rechargeable or secondary electrochemical storage devices or batteries have wide-ranging applications and development of improved battery performance is a long-standing goal. Maximizing the volumetric or gravimetric energy density (i.e. minimizing the cell volume or mass) is an important and closely tracked performance metric. Rechargeable electrochemical cells such as Li-ion and NiMH use an electrochemically active, non-metallic, insertion material at the negative electrode or anode. However, many electrochemical storage systems involve the use of an electrochemically active metal at the anode. Commercial examples include Pb-acid, Na—$NiCl_2$ (ZEBRA), Li metal polymer and Ag—Zn, but many other examples have been explored in the laboratory setting including Li—S, non-aqueous Na, and Mg.

In general, in all closed system or sealed container liquid-based cells, the cell is designed such that the capacity of the anode exceeds the capacity of the cathode.

For example in an Mg cell (Aurbach, D. et. al., Prototype systems for rechargeable magnesium batteries, Nature 407 (2000), 724-727) the negative electrode is typically a metallic Mg foil or ribbon on the order of at least 100 µm thick, or 38 mAh/cm$^2$; containing significant excess capacity relative to the cathode which is typically constructed at <5 mAh/cm2. Calculating the N/P ratio of these cells, where N and P are the areal electrochemical capacity of the negative and positive electrodes (measured in mAh/cm2), the Mg cells reported in the literature have N/P typically >10 and frequently >30. For further example in a Zn cell the negative electrode is typically a Zn metal foil or block. In still a further example in a Pb-acid cell the anode comprises a large block of Pb, always in significant excess capacity relative to the cathode.

Another report is Zheng, Y. et. al., Magnesium cobalt silicate materials for reversible magnesium ion storage, Electrochemica Acta, 66(2012), 75-81, which discloses a Magnesium battery having a solid Mg metal foil as the anode. The battery is built in the fully discharged state and has a thick Mg metal foil as the anode, giving an anode excess N/P>1.

In yet another report Liu, B. et. al., Rechargeable Mg-Ion Batteries Based on $WSe_2$ Nanowire Cathodes, ACS Nano, 7(2013), 8051-80587, which discloses a Magnesium battery having a solid Mg metal foil as the anode. The battery is built in the fully charged state and has a thick Mg metal foil as the anode, giving an anode excess N/P>1.

Two classes of closed system Li cells seem especially relevant for the present discussion. In a standard Li-ion cell, Li ions are intercalated into, or shuttled between, both the cathode and anode. The anode may typically be graphite, although a range of other anode materials such as silicon, germanium, tin, aluminum, and alloys thereof are also well known. In addition, low voltage intercalation hosts, such as lithium titanium oxide ($Li_4Ti_5O_{12}$ or "LTO"), and conversion materials, such as low voltage oxides, may be used as an anode. In all these cases it is well known in the art that it is necessary to design a cell with more reversible capacity at the anode than at the cathode. This is to ensure that during as-rated charging operation (i.e. transfer of lithium and electrons from cathode to anode at a designated rate) the anode may always accept more lithium than is removed from the cathode. Excess-anode devices constructed in this manner minimize the risk of plating lithium metal during charging which is widely believed to be detrimental to cell cycle life and safety. Thus lithium-ion cells are designed with an excess of reversible capacity on the negative electrode, typically denoted as an N/P ratio of >1. The required excess of negative electrode varies depending on the selected anode material, but may typically lie in the range 20-40% (for graphite) to 10% (for LTO). Thus in a lithium-ion battery it is well known that an N/P ratio>1 and general N/P>1.1 is required for good operation of the device.

In a lithium metal cell with a liquid or gel electrolyte, the anode is chosen to be a metal foil of lithium or a metallic alloy of Li such as LiAl, (a range of such anodes are well known). Examples of such cell chemistries include lithium-sulfur cells (Sion, Oxis), lithium-molybdenum disulfide (Moli) and lithium-vanadium oxide (Avistor, Valence, Batscap, Bollore, NTT). However lithium metal anodes are known to be highly reactive, which on cycling continuously generate high surface area lithium and decomposition products. The generation of high surface area metallic lithium and decomposition products lowers the onset of thermal instability leading to significant and well documented safety hazards. Additionally, metallic lithium anodes are known to rapidly lose accessible capacity through the formation of finely divided and electrically isolated regions of metallic lithium. Because of the reactivity of lithium, such lithium metal cells with liquid electrolyte are designed with a very large N/P ratio. The N/P ratio in a lithium metal cell is typically around 10, but in cases where the cell volume is minimized N/P may be around 4 (K. Brandt Solid State Ionics 69, (1994) 173-183 and Electrically Rechargeable Metal-air Batteries Compared to Advanced Lithium-ion Batteries, presented by Jeff Dahn at IBM Almaden Institute, 2009). Thus in any lithium metal cell having a liquid electrolyte, it is well known that an N/P ratio>>1 and in general N/P>4 is required for good operation of the device (i.e., useful cycle life and energy density).

Similar arguments to the forgoing also apply to open-system cells, such as Zn-air and Li-air and again the cells are designed with a metal anode that has much larger capacity than the capacity of the cathode electrode. While such open-system cells utilize air as an active material, the capacity of the cathode electrode (P) is well defined and limited to a finite value. Therefore in such cells N/P is again designed to be >1.

An exception to the N/P>1 rule would be a solid-electrolyte lithium-metal cell such as that reported in U.S. Pat. No. 6,168,884 B1 issued Jan. 2, 2001 to Neudecker et al., where it is generally known that the solid electrolyte has negligible reaction with the lithium metal anode, so that a cell may be designed which has an N/P ratio<1. Similar cells have subsequently been reported by numerous authors. For example, in Neudecker, a cell is shown having no lithium metal in the fully discharged state. Because the reaction with a solid electrolyte is negligible, the Neudecker all-solid cell can be cycled reversibly many times despite having an N/P ratio<1. However, the cell reported by Neudecker suffers from a prohibitively low electrode loading, generally less than 0.1 mAh/cm2, required to meet a practical rate capability.

In a similar fashion to Neudecker, other solid-electrolyte cells such as those described in U.S. Pat. No. 6,402,795 issued Jun. 11, 2002 to Chu et al. use a solid electrolyte barrier layer, also referred to as a passivation layer in conjunction with a liquid electrolyte. The barrier layer, deliberately coated onto the negative electrode prior to cell assembly, is required to prevent spontaneous and continued reaction of the anode material with the liquid electrolyte. However, all solid-electrolyte cells as well as hybrid barrier layer with liquid electrolyte cells suffer from major disadvantages in terms of manufacturability and rate performance.

Another report is U.S. Pat. No. 5,314,765, Protective lithium ion conducting ceramic coating for lithium metal anodes and associate method, issued May 24, 1994 to Bates, which is said to disclose a battery structure including a cathode, a lithium metal anode and an electrolyte disposed between the lithium anode and the cathode utilizes a thin-film layer of lithium phosphorus oxynitride overlying so as to coat the lithium anode and thereby separate the lithium anode from the electrolyte. If desired, a preliminary layer of lithium nitride may be coated upon the lithium anode before the lithium phosphorous oxynitride is, in turn, coated upon the lithium anode so that the separation of the anode and the electrolyte is further enhanced. By coating the lithium anode with this material lay-up, the life of the battery is lengthened and the performance of the battery is enhanced.

In summary, electrochemical systems that contain liquid or gel electrolyte, and not exclusively solid electrolyte, are designed either with an intercalation anode having an N/P ratio>1 and typically >1.2, or with a pure metal anode having an N/P ratio>1 and typically >4. This arises from a belief that plated metal has a poorly controlled morphology or undergoes spontaneous chemical reactions with electrolyte components and therefore it is advantageous to either have a large metal excess in order to counteract these processes, or to avoid plating metal altogether as for intercalation systems.

In a recent report "Electrically Rechargeable Metal-air Batteries Compared to Advanced Lithium-ion Batteries", presented at IBM Almaden Institute, 2009 by Jeff Dahn, NSERC/3M Canada Industrial Research Chair, Depts. of Physics and Chemistry, Dalhousie University: Canada, which teaches practitioners not to use metallic Lithium in rechargeable cells. Additionally it is said to teach that excess lithium, or N/P>1, is a requirement for electrochemical cells utilizing a metal lithium anode. Specifically N/P=4 is required for useful cycle life.

An additional report is K. Brandt, Solid State Ionics 69, (1994) 173-183, which teaches that rechargeable Li batteries in general require N/P>1 for electrochemical cells.

In yet another report is Harry, Hallinan, Parkinson, Mac-Dowell, and Balsara, Detection of subsurface structures underneath dendrites formed on cycled lithium metal electrodes, *Nature Materials* 2013, 13, 69-73 which is said to disclose that during the early stage of dendrite development, the bulk of the dendritic structure lies within the metal electrode, underneath the polymer/electrode interface. Furthermore, they observed crystalline impurities, present in the uncycled lithium anodes, at the base of the subsurface dendritic structures. The portion of the dendrite protruding into the electrolyte increases on cycling until it spans the electrolyte thickness, causing a short circuit. Contrary to conventional wisdom, it seems that preventing dendrite formation in polymer electrolytes depends on controlling the formation of subsurface structures in the lithium electrode present prior to cell assembly.

Yet another report is Vaughey et al., Lithium Metal Anodes, Annual Merit Review, DOE Vehicle Technologies Program, Washington, D.C., May 19, 2009, which is said to teach, inter alia, that cycled lithium metal anodes have a complex morphology that lies at the heart of the lifetime problems.

Another report is Mikhaylik, Protection of Li Anodes Using Dual Phase Electrolytes (Sion Power, DoE SERE report May 10, 2011), which is said to teach the protection of Li anode with dual phase electrolyte eliminated thermal runaway for 50% of the 0.25 Ah rechargeable Li—S cells tested at end of life.

Yet another report is Park, M. S., et. al. A highly reversible lithium metal anode. Nature Scientific Reports, 4, (2014), 3815, which is said to disclose a novel electrolyte system that is relatively stable against lithium metal and mitigates dendritic growth. A significant basis for the paper is a cell model in which N/P is 1.1 and 3 (i.e., N/P>1) for lithium ion and lithium metal cells respectively.

Another report is U.S. Pat. No. 6,706,447, Lithium Metal Dispersion In Secondary Battery Anodes, issued Mar. 16, 2004 to Gao et al., which is said to disclose a secondary battery having a high specific capacity and good cyclability, and that can be used safely. This document inter alia explicitly states the requirement that the amount of metal used in the battery should be chosen to be less than the amount that can be incorporated into the anode (i.e. N>P)

Yet another report is Li et al., A Review Of Lithium Deposition In Lithium-Ion And Lithium Metal Secondary Batteries, Journal of Power Sources 254 (2014) 168-182, which is said to disclose major aspects related to lithium deposition in lithium-ion and lithium metal secondary batteries are reviewed. For lithium-ion batteries with carbonaceous anode, lithium deposition may occur under harsh charging conditions such as overcharging or charging at low temperatures. The authors state that metal deposition is always disadvantageous, and that the solution includes ensuring that the battery design has a sufficiently large excess of anode or N/P>1.

Another report is U.S. Pat. No. 6,258,478 B1, Electrode Assembly Having A Reliable Capacity Ratio Between Negative And Positive Active Materials And Battery Having The Same, issued Jul. 10, 2001 to Kim, which is said to disclose a roll electrode assembly used in a secondary battery includes a positive electrode applied with a positive active material, a negative electrode applied with a negative active material, and a separator disposed between said positive and negative electrodes. A thickness of the positive or negative active materials applied on opposite sides of positive or negative substrates of the positive or negative electrodes are different from each other such that the capacity ratio between the positive and negative electrodes (N/P) can be maintained above 1.

Yet another report is U.S. Pat. No. 5,422,203, Disposing A Prepared Electrolyte Between The Electrodes, The Non-aqueous Electrolyte Comprising Of Lithium Tetrafluoroborate Lithium Hexafluorophosphate, Dimethyl Carbonate And Ethylene Carbonate, issued Jun. 6, 1995 to Guyomard et al., which is said to disclose that irreversible loss of lithium during the initial discharge cycle of secondary batteries with carbon intercalation electrodes is substantially reduced by employing as the cell electrolyte a non-aqueous solution of $LiPF_6$ in a mixture of dimethylcarbonate and ethylene carbonate. By this means, in a secondary battery cell comprising, for example, a $Mn_2O_4$ positive electrode and a graphite negative electrode, up to about 90% of the theoretical level of lithium can be reversibly cycled at an exceptionally high rate of about CR (complete discharge in one hour).

In yet another report on non-aqueous electrolyte batteries with a negative electrode comprising lithium titanate (LTO), U.S. Pat. No. 7,883,797, issued Feb. 8, 2011 to Kishi et al. states "[a] non-aqueous electrolyte battery . . . has a positive electrode having a discharge capacity of 1.05 or more times that of a negative electrode thereof." However, Kishi et al. explicitly recite at column 4, lines 52-60: "The discharge capacity of the aforementioned positive electrode is preferably 1.10 or less times that of the aforementioned negative electrode to prevent the extreme drop of the capacity of the entire battery and the potential of the negative electrode. In particular, the discharge capacity of the aforementioned positive electrode is more preferably from 1.05 to 1.07 times that of the aforementioned negative active electrode to prevent the deterioration of the positive active material at a temperature as high as 60° C. or more." The inverse of a ratio (i.e., the N/P ratio) of 1.10 to 1 is a ratio of 1/1.10=0.91.

Another report is Gallagher, K. and Nelson P. Manufacturing Costs of Batteries for Electric Vehicles. In Lithium-Ion Batteries: Advances and Applications, Pistoia, G. Ed.; Elsevier Science & Technology Book, 2014; p 103, which teaches the negative electrode thickness is determined by its specific reversible capacity and the designed excess capacity to prevent lithium plating during charging. The report teaches a ratio of 1.25 negative to positive reversible capacity ratio (N/P ratio) for cells with graphite negative electrodes. Lithium titanium oxide (LTO) negative electrode-based cells are designed at a 1.1 N/P ratio because of the minimal possibility of lithium metal deposition.

There is a need for improved secondary electrochemical storage devices and maximizing the volumetric or gravimetric energy density of said devices remains a clear design goal.

SUMMARY OF THE INVENTION

The present invention is based on three novel and very surprising observations. First, the surface roughness obtained by stripping a metal anode is larger than that obtained by plating the same metal onto a substrate of another kind. Second, that by appropriate choice of plating conditions it is possible to obtain useful cycle life from a metal anode plated in-situ, for the first time, onto a substrate of another kind and subsequently cycled reversibly. Third, that the first two observations are valid for both Mg and Li.

According to one aspect, the invention features a secondary cell comprising a cathode electrode capable of a capacity of P mAh in communication with a liquid or gel electrolyte; an anode electrode capable of a capacity of N mAh in communication with the electrolyte; and a separator permeable to at least one mobile species which is redox-active at least one of the anode and the cathode; designed and constructed such that the anode capacity N is smaller than that of the cathode capacity P, hence N/P<0.9.

According to another aspect, the invention features a secondary cell comprising a cathode electrode capable of a capacity of P mAh in communication with the electrolyte; an anode electrode capable of a capacity of N mAh in communication with the electrolyte; and separator permeable to at least one mobile species which is redox-active at least one of the anode and the cathode, characterized in that the anode capacity N is about equal to that of the cathode capacity P.

According to another aspect, the invention features a secondary cell comprising an electrode capacity ratio of N/P<0.9 and a liquid or gel electrolyte in direct interface with the anode active material.

In another embodiment, the invention comprises a secondary cell wherein negligible redox active material is contained at the anode when the cell is nominally at 100% depth-of-discharge, therefore N/P is about equal to 0.

In another embodiment the cell may be manufactured in the fully-discharged state and charged subsequent to sealing of the cell, so that the plating metal is deposited in-situ within the cell and without exposure to the environment and resulting adverse reactions.

In one embodiment the anode may be magnesium metal, said magnesium being fully incorporated into the discharged cathode when the cell is built, so that the metal anode forms only during the first charge of the cell. A benefit of this is that the resulting metal morphology may lack features arising from undesired reactions with ambient atmosphere.

In one embodiment the anode may be lithium metal, said lithium being fully incorporated into the discharged cathode electrode when the cell is built, so that the lithium metal anode forms only during the first charge of the cell. A benefit of this is that the resulting metal morphology may lack features arising from undesired reactions with ambient atmosphere.

In another embodiment, the invention features a secondary cell comprising a gel electrolyte in direct interface with the anode electrode.

In another embodiment, the liquid or gel electrolyte contains a salt anion comprising at least one of boron, carbon, nitrogen, oxygen, fluorine, aluminum, silicon, phosphorous, sulfur, or chlorine.

In still another embodiment, the secondary cell is configured to enable >99.35% Coulombic efficiency between the electrolyte and negative electrode.

In yet another embodiment, the secondary cell is configured as a multi-layered prismatic, or laminate cell, or a wound jelly roll in a cylindrical, or flat prismatic.

In a further embodiment, the secondary cell is configured to contain a so-called gate electrode, a third electrode disposed predominantly between the anode and cathode electrodes, in addition to the cathode electrode and the anode electrode.

According to one aspect, the invention features a rechargeable electrochemical cell. The rechargeable electrochemical cell comprises a non-aqueous fluid electrolyte; a negative electrode in direct physical contact with the non-aqueous fluid electrolyte; a positive electrode in direct physical contact with the non-aqueous fluid electrolyte; an electronically insulating separator configured to separate the negative electrode and the positive electrode; the positive electrode and the negative electrode configure such that a capacity of the positive electrode is strictly greater than a capacity of the negative electrode, In one embodiment, a ratio of reversible capacity between the positive electrode and the negative electrode of the electrochemical cell is such that Q(positive electrode)/Q (negative electrode)>1.11.

In another embodiment, the rechargeable electrochemical cell is configured to charge to greater than or equal to 4.3 V.

In yet another embodiment, the rechargeable electrochemical cell is configured to discharge to −2.5 V.

In still another embodiment, the rechargeable electrochemical cell is configured to charge and discharge at ≤10 C-rate of rated capacity in either continuous or pulse current conditions.

In a further embodiment, the rechargeable electrochemical cell is configured to discharge and charge at temperatures in the range of −20° C. and 200° C.

In a further embodiment, the rechargeable electrochemical cell is configured to discharge and charge at temperatures in the range of −50° C. and 300° C.

In yet a further embodiment, the rechargeable electrochemical cell is configured to charge and discharge with >99.35% Coulombic efficiency.

In an additional embodiment, the rechargeable electrochemical cell is configured to provide at least 80% of initial capacity for greater than 30 charging and discharging cycles.

In still a further embodiment, the negative electrode is configured to provide >1000 mAh/cc.

In one embodiment, the negative electrode comprises electrochemically active material amounting to less than 100% of the electrochemically active cathode.

In another embodiment, the non-aqueous fluid electrolyte comprises at least one active cation selected from the group consisting of Mg ion, Al ion, Ca ion, Sr ion, Ba ion, Li ion, Na ion, K ion, Rb ion, Cs ion, and onium.

In another embodiment, the non-aqueous fluid electrolyte comprises a complex cationic species comprising at least one of Mg ion, Al ion, Ca ion, Sr ion, Ba ion, Li ion, Na ion, K ion, Rb ion, Cs ion, and onium.

In yet another embodiment, the non-aqueous fluid electrolyte contains a symmetric or asymmetric aluminum-based or boron-based anion.

In yet another embodiment, the non-aqueous fluid electrolyte contains a symmetric or asymmetric four-coordinate aluminum-based or boron-based anion.

In still another embodiment, the non-aqueous fluid electrolyte comprises a salt, or combination of salts in a concentration in the range of 0.5 M to saturated concentration.

In a further embodiment, the non-aqueous fluid electrolyte comprises an anion selected from the group consisting of tetrachloroaluminate, tetrachloroborate, bis(oxalato)aluminate, difluoro-oxalato aluminate, difluoro-oxalato borate, or bis(oxalato)borate, bis(malonato)borate, bis(perfluoropinacolato)borate, tetrafluoroborate, triborate ($B_3O_7^{5-}$), tetraborate ($B_4O_9^{6-}$), metaborate ($BO_2^-$), and combinations thereof.

In yet a further embodiment, the non-aqueous fluid electrolyte comprises at least one of $Mg[BF_2(C_2O_4)]_2$, $Mg[B(C_2O_4)_2]_2$, $LiBF_2(C_2O_4)$, $LiB(C_2O_4)_2$, $NaBF_2(C_2O_4)$, and $NaB(C_2O_4)_2$, or combinations thereof.

In an additional embodiment, the rechargeable electrochemical cell configured to electroplate Mg or Li and the non-aqueous fluid electrolyte comprises between 1.0 M and 4.0 M of at least one of $LiBF_2(C_2O_4)$, $LiB(C_2O_4)_2$, $Mg[BF_2(C_2O_4)]_2$, $Mg[B(C_2O_4)_2]_2$, or combinations thereof, dissolved in at least one non-aqueous organic solvent.

In one more embodiment, at least one of the negative electrode or positive electrode comprises a metal, an alloy, or an intermetallic compound.

In still a further embodiment, at least one of the negative electrode or positive electrode comprises a material configured to undergo an insertion reaction, an intercalation, a disproportionation, a conversion reaction, or a combination thereof.

In one embodiment, a pressure perpendicular to the interface of the positive and negative electrodes is greater than 0.06 MPa.

In another embodiment, the rechargeable electrochemical cell further comprises at least one gate electrode having a gate electrode electrical terminal, the gate electrode in communication with the non-aqueous fluid electrolyte and permeable to at least one mobile species which is redox-active at at least one of the positive electrode and the negative electrode, the gate electrode situated between the positive electrode and the negative electrode.

In yet another embodiment, the rechargeable electrochemical cell comprises a metal, which is configured to plate onto the negative electrode during charging.

In still another embodiment, the metal is selected from the group consisting of Mg, Li, and Na.

In one embodiment, a ratio defined by the capacity of the negative electrode divided by the capacity of the positive electrode is in a range selected from the ranges of zero to 0.10, zero to 0.20, zero to 0.30, zero to 0.40, zero to 0.50, zero to 0.60, zero to 0.70, zero to 0.80, zero to 0.85, and zero to 0.90.

In another embodiment, a ratio defined by the capacity of the negative electrode divided by the capacity of the positive electrode is in a range selected from the ranges of 0.05 to 0.10, 0.05 to 0.20, 0.05 to 0.30, 0.05 to 0.40, 0.05 to 0.50, 0.05 to 0.60, 0.05 to 0.70, 0.05 to 0.80, 0.05 to 0.85, and 0.05 to 0.90.

According to another aspect, the invention relates to a rechargeable electrochemical storage device. The rechargeable electrochemical storage device comprises an anode electrode comprising the metal form of the electro-active species, the rechargeable electrochemical storage device configured to electroplate metal at the anode electrode, the anode electrode comprising less than or equal to 3 mAh/cm$^2$ of electro-active material in the discharged state.

In one embodiment, a ratio of reversible capacity between the positive electrode and the negative electrode of the electrochemical storage device is such that Q(positive electrode)/Q(negative electrode)>1.11.

In another embodiment, the rechargeable electrochemical storage device is configured to charge to greater than or equal to 4.3 V.

In yet another embodiment, the rechargeable electrochemical storage device is configured to discharge to −2.5 V.

In still another embodiment, the rechargeable electrochemical storage device is configured to charge and discharge at ≤10 C-rate of rated capacity in either continuous or pulse current conditions.

In a further embodiment, the rechargeable electrochemical storage device is configured to discharge and charge at temperatures in the range of −20° C. and 200° C.

In a further embodiment, the rechargeable electrochemical storage device is configured to discharge and charge at temperatures in the range of −50° C. and 300° C.

In yet a further embodiment, the rechargeable electrochemical storage device is configured to charge and discharge with >99.35% Coulombic efficiency.

In an additional embodiment, the rechargeable electrochemical storage device is configured to provide at least 80% of initial capacity for greater than 30 charging and discharging cycles.

In still a further embodiment, the negative electrode is configured to provide >1000 mAh/cc.

In one embodiment, the negative electrode comprises electrochemically active material amounting to less than 100% of the electrochemically active cathode.

In another embodiment, the non-aqueous fluid electrolyte comprises at least one active cation selected from the group consisting of Mg ion, Al ion, Ca ion, Sr ion, Ba ion, Li ion, Na ion, K ion, Rb ion, Cs ion, and onium.

In another embodiment, the non-aqueous fluid electrolyte comprises a complex cationic species comprising at least one of Mg ion, Al ion, Ca ion, Sr ion, Ba ion, Li ion, Na ion, K ion, Rb ion, Cs ion, and onium.

In yet another embodiment, the non-aqueous fluid electrolyte contains a symmetric or asymmetric aluminum-based or boron-based anion.

In yet another embodiment, the non-aqueous fluid electrolyte contains a symmetric or asymmetric four-coordinate aluminum-based or boron-based anion.

In still another embodiment, the non-aqueous fluid electrolyte comprises a salt, or combination of salts in a concentration in the range of 0.5 M to saturated concentration.

In a further embodiment, the non-aqueous fluid electrolyte comprises an anion selected from the group consisting of tetrachloroaluminate, tetrachloroborate, bis(oxalato)aluminate, difluoro-oxalato aluminate, difluoro-oxalato borate, or bis(oxalato)borate, bis(malonato)borate, bis(perfluoropinacolato)borate, tetrafluoroborate, triborate ($B_3O_7^{5-}$), tetraborate ($B_4O_9^{6-}$), metaborate ($BO_2^-$), and combinations thereof.

In yet a further embodiment, the non-aqueous fluid electrolyte comprises at least one of $Mg[BF_2(C_2O_4)]_2$, $Mg[B(C_2O_4)_2]_2$, $LiBF_2(C_2O_4)$, $LiB(C_2O_4)_2$, $NaBF_2(C_2O_4)$, and $NaB(C_2O_4)_2$, or combinations thereof.

In an additional embodiment, the rechargeable electrochemical storage device configured to electroplate Mg or Li and the non-aqueous fluid electrolyte comprises between 1.0 M and 4.0 M of at least one of $LiBF_2(C_2O_4)$, $LiB(C_2O_4)_2$, $Mg[BF_2(C_2O_4)]_2$, $Mg[B(C_2O_4)_2]_2$, or combinations thereof, dissolved in at least one non-aqueous organic solvent.

In one more embodiment, at least one of the negative electrode or positive electrode comprises a metal, an alloy, or an intermetallic compound.

In still a further embodiment, at least one of the negative electrode or positive electrode comprises a material configured to undergo an insertion reaction, an intercalation, a disproportionation, a conversion reaction, or a combination thereof.

In one embodiment, a pressure perpendicular to the interface of the positive and negative electrodes is greater than 0.06 MPa.

In another embodiment, the rechargeable electrochemical storage device further comprises at least one gate electrode having a gate electrode electrical terminal, the gate electrode in communication with the non-aqueous fluid electrolyte and permeable to at least one mobile species which is redox-active at at least one of the positive electrode and the negative electrode, the gate electrode situated between the positive electrode and the negative electrode.

In yet another embodiment, the rechargeable electrochemical storage device comprises a metal which is configured to plate onto the negative electrode during charging.

In still another embodiment, the metal is selected from the group consisting of Mg, Li and Na.

In one embodiment, a ratio defined by the capacity of the negative electrode divided by the capacity of the positive electrode is in a range selected from the ranges of zero to 0.10, zero to 0.20, zero to 0.30, zero to 0.40, zero to 0.50, zero to 0.60, zero to 0.70, zero to 0.80, zero to 0.85, and zero to 0.90.

In another embodiment, a ratio defined by the capacity of the negative electrode divided by the capacity of the positive electrode is in a range selected from the ranges of 0.05 to 0.10, 0.05 to 0.20, 0.05 to 0.30, 0.05 to 0.40, 0.05 to 0.50, 0.05 to 0.60, 0.05 to 0.70, 0.05 to 0.80, 0.05 to 0.85, and 0.05 to 0.90.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 1A shows a scanning electron microscopy (SEM) micrograph of a magnesium metal anode partially discharged (i.e., partially stripped) from a magnesium cell after repeated stripping and plating upon the Mg metal anode.

FIG. 1B is an image taken of an Mg metal anode from a magnesium cell after repeated stripping and plating upon the Mg metal anode.

FIG. 2A shows a scanning electron microscopy (SEM) micrograph of a magnesium metal anode formed by electroplating Mg onto Pt in a magnesium cell after repeated stripping and plating of the Mg upon the Pt.

FIG. 2B is an image of the Mg metal electroplated onto the Pt working electrode in a magnesium cell after repeated stripping and plating Mg upon the Pt metal substrate.

DETAILED DESCRIPTION

Figure 3:
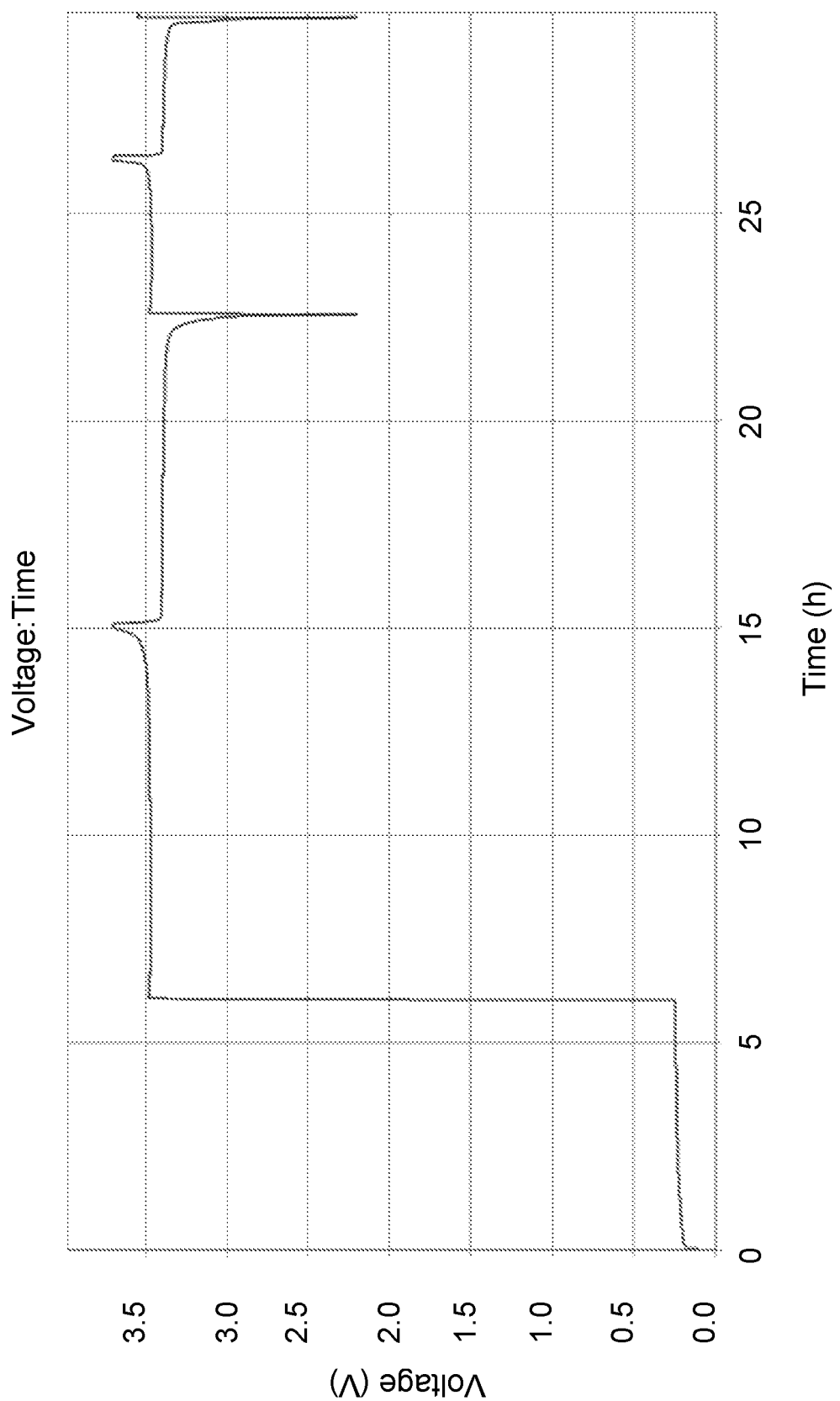
FIG. 3 shows a typical voltage profile of a cell having N/P ratio <0.9 and comprising lithium hexafluorophosphate in ethylene carbonate and dimethyl carbonate-based electrolyte and cycling Li metal.

The invention described herein relates to electrochemical cells in general, and particularly to an electrochemical cell having a charge capacity of the cathode being greater than or equal to the charge capacity of its anode. We describe a secondary battery having a non-aqueous liquid or gel electrolyte without a barrier layer over the negative electrode and having less than or equal to the capacity of electrochemically active material at the negative electrode than can be accommodated in the cathode. A goal of the present invention is to provide a battery utilizing a liquid electrolyte and having a metal anode electrode with electrochemical capacity N, a cathode with capacity P, and an N/P ratio<0.9.

Such a battery will be shown to provide substantially higher gravimetric and volumetric energy and power than prior known secondary cells.

It is desirable that secondary electrochemical storage devices avoid the manufacturability problems, poor rate performance, and inability to entirely prevent dendrites associated with solid electrolytes. Furthermore solid electrolyte cells typically require very low loading of active material, or low utilization at higher loadings thus limiting the actual energy (Wh), specific energy (Wh/kg), and energy density (Wh/L) that can be delivered in a cell. It is also desired that these storage devices are manufactured without adverse air reactions at the anode. Lastly, it is desired to maximize the energy density of the storage device, by minimizing the volume and mass of electrochemically inactive components.

The design described above is motivated by an effort to surpass the energy and safety limitations of previous secondary cell designs. However, it would appear that the result observed comes as a surprise to one of ordinary skill in the relevant art because cell designs previously shown to reversibly electrodeposit metal at or near room temperature generally required large excess capacity of the anode in order to demonstrate useful cycle life. However, in adding metal anode sufficient to achieve useful cycle life the resulting energy density of the cell is significantly reduced. Owing to the high purity and uniformity of the electrodeposit formed in the cell design described herein, commercially significant cycle life and energy can be obtained. The purity of the plated metal also enables the creation of cells capable of tolerating Coulombic inefficiency in a wide variety of electrolytes, containing <1000 ppm $H_2O$, under various cycling conditions.

Further, the technology disclosed herein will enable the use of composite or metallic electrodes without the need for excess electrode material, consequently enabling the energy density of batteries to increase substantially. A technology that also allows the use of metallic electrodes would provide the potential for performance improvements in many "next-generation" rechargeable chemistries including, as non-limiting examples, Magnesium metal, Sodium metal, and Lithium metal. In addition, a technology that would minimize impurities in the electroactive anode material will mitigate failure-modes due to both the generation of high surface area electrode material and decomposition products at one or both electrodes resulting in thermal runaway, and dendritic growths that can lead to a short-circuit electrical condition. Such an invention would allow for greatly enhanced safety in high energy secondary cells.

Furthermore a technology enabling excess cathode capacity when utilizing conventional intercalation host electrodes including, but not limited to graphite, or alloying, conversion, and disproportionation reaction electrodes will also enhance the battery capacity and safety. FIG. 1A shows an SEM of a magnesium anode partially discharged (i.e., partially stripped) after cycling in a magnesium cell. Prior to cycling, the anode consisted of bulk Mg foil rolled to a thickness of ~50 μm. Due to a presumed reaction between atmosphere and the metal, it is expected that prior to discharge the foil is coated with a thin passivating film of a mixed oxide/hydroxide. Further, it is expected that based upon known literature that, despite the passivating layer, this anode will cycle well and become and remain uniform throughout cycling. First, any passivating films will be rapidly disrupted during initial stripping operations. Second, as the electrode cycles, any regions remaining passivated become mechanically unstable until the surface is essentially unpassivated and active everywhere. Third, transport within the electrolyte will favor stripping from the points closest to the counter-electrode so that an initially rough surface will quickly smooth and become uniform on stripping. Hence it is expected that after cycling the surface will become electrochemically active everywhere (i.e. no passivating film remaining) and with limited height variations or surface roughness across the surface.

In sharp contrast to previous reports and the known scientific literature, the SEM in FIG. 1A shows that the surface of a stripped Mg anode is heavily pitted and shows local height variations on a scale of over 50 microns. Deposited Mg material shown in FIG. 1A, 105, is seen on the surface. In addition, large areas of the "as-prepared" surface, 110 in FIG. 1A, of the polished Mg foil remain clearly visible, with the original polishing marks surviving. X-Ray analysis reveals that this is a consequence of passivation of the Mg surface by regions of a mixed oxide/hydroxide, which remains largely inert in the Mg electrolyte even as Mg metal is being stripped. When stripping of Mg begins, pits nucleate at pinholes in this passivating film, and then grow very rapidly. However rather than expanding to include the entire surface of magnesium foil, both the stripping and plating remain localized (concentrated) in unpassivated regions. As a consequence of this behavior the surface undergoes continual roughening as the cycling continues (as shown in FIG. 1B), rather than becoming smoother. Because almost 50% of the area of the electrode is inactive, the thickness of metal deposition in the reduced active surface area required to balance the counter electrode is over twice that required for an electrode with 100% active area. Indeed, atomic force microscopy (AFM) of such surfaces indicates height variations of greater than three times the cycled thickness. This roughness will become a prohibitively large overhead in the design of any cell that includes such an electrode because a large excess of anode will be required to achieve the necessary cycle life for commercial viability.

Given this very unexpected result, the question arises whether the electrode roughness arising from starting with a native metal anode is actually larger than the roughness obtained by plating the metal onto an electrode of another kind. Traditionally, plating roughness and specifically dendrites have been assumed to be small for Mg cells (Aurbach, D. et. al., Chemical Record, 3, (2003), 61 and, Matsui, M., Journal of Power Sources, 196 (2011), 7048-7055). However, studies of Mg plating and stripping have generally been measured for Mg plated on an inert current-collector, such as Pt, and subsequently cycled while many practical devices begin with a foil of the native metal. FIG. 2A depicts SEM of the compact, uniform Mg deposit that forms when plating onto a Pt substrate, as opposed to the Mg substrate in FIG. 1A. This contrast suggests that the presence of microscopic non-uniformities on an ostensibly uniform and clean Mg surface dramatically impact the overall surface morphology of the anode during cycling. This image depicted in FIG. 2B shows a highly uniform, micro-foil-like deposit of Mg can be collected from Pt, which is in sharp contrast to the surface of the Mg in FIG. 1B. It is therefore clear that dramatic changes in plated metal surface morphology can be expected whether a much purer metal anode is formed during an in-situ plating operation versus forming ex-situ prior to introduction into the electrochemical cell. Further evidence of this is exhibited in the asymmetry of polarization observed between plating and stripping of Mg metal, which is magnified when plating Mg onto Mg vs. depositing Mg onto a dissimilar conducting substrate such as Pt. Therefore it should be expected that important physical properties of metal anode cells, such as surface roughness and area, will be different for electrodes formed ex-situ versus in-situ to the assembly of an electrochemical cell.

This is a critical discovery, since it shows that there are major benefits to constructing a cell in which some or all of the anode (in this case Mg) is plated (formed) after the cell is assembled. However, this would correspond to N/P<0.9, generally believed to be problematic. In the remainder of this disclosure we will show that it is in fact possible to overcome the conventional understanding that an N/P ratio of less than 0.9 is problematic, and we provide a few (non-limiting) examples for how to accomplish this.

While the evidence described thus far is based on observations of magnesium metal as the electroactive anode material, we have now established that our findings are in fact transferable to other metals, for example, lithium. It is widely acknowledged that the electrochemical cycling of lithium metal is intrinsically inefficient, to such an extent that excess lithium must be introduced into any secondary lithium metal cell to a degree that N/P is often as large as 10, and reports of practical cells achieving useful cycle life require N/P equal to 4 are known. Therefore, any cell in which lithium makes direct physical contact with a liquid electrolyte, a lithium metal anode is used in large excess to obtain cycle life of practical value. In addition, recent reports indicate that during the early stage of dendrite development, the bulk of the dendritic structure lies within the Li metal electrode, underneath the electrolyte/electrode interface in close proximity to crystalline impurities present in the uncycled lithium anode. This is contrary to conventional wisdom, and conforms to the non-limiting aspects of this disclosure in that a significant aspect of performance depends upon controlling the formation of subsurface structures in the lithium electrode present prior to cell assembly.

In contradistinction, we have found it possible to construct a cell with (N/P) of about 0 while simultaneously maintaining cycle life required for practical value.

Example 1

FIG. 3 shows a typical voltage profile of a cell containing N/P ratio <0.9. Upon assembly the cell open circuit potential (~0.3 V) is generally representative of the cathode electrode potential difference from that of the anode electrode substrate potential (e.g., Ni, Cu, etc.). Initiating cell charging corresponds to a rapid increase in cell potential as $Li^+$ transfers from the cathode to plate out upon the anode Cu substrate, lowering that negative electrode potential to near −3 V vs. SHE. The corresponding cell potential jumps to about 3.5 V, and rises monotonically thereafter to charge cutoff at about 3.7 V. Thereafter discharge and charge can occur anywhere within this window as the anode electrode potential remains low due to the potential of the decomposition products upon the surface. This cell contains a lithium iron phosphate cathode assembled vs. a copper negative electrode substrate and immersed in a lithium hexafluorophosphate in ethylene carbonate and dimethyl carbonate-based electrolyte. All cycling was conducted at room temperature. The first cycle was conducted at 17 mA/g while the subsequent cycling is 34 mA/g.

Example 2

Figure 4:
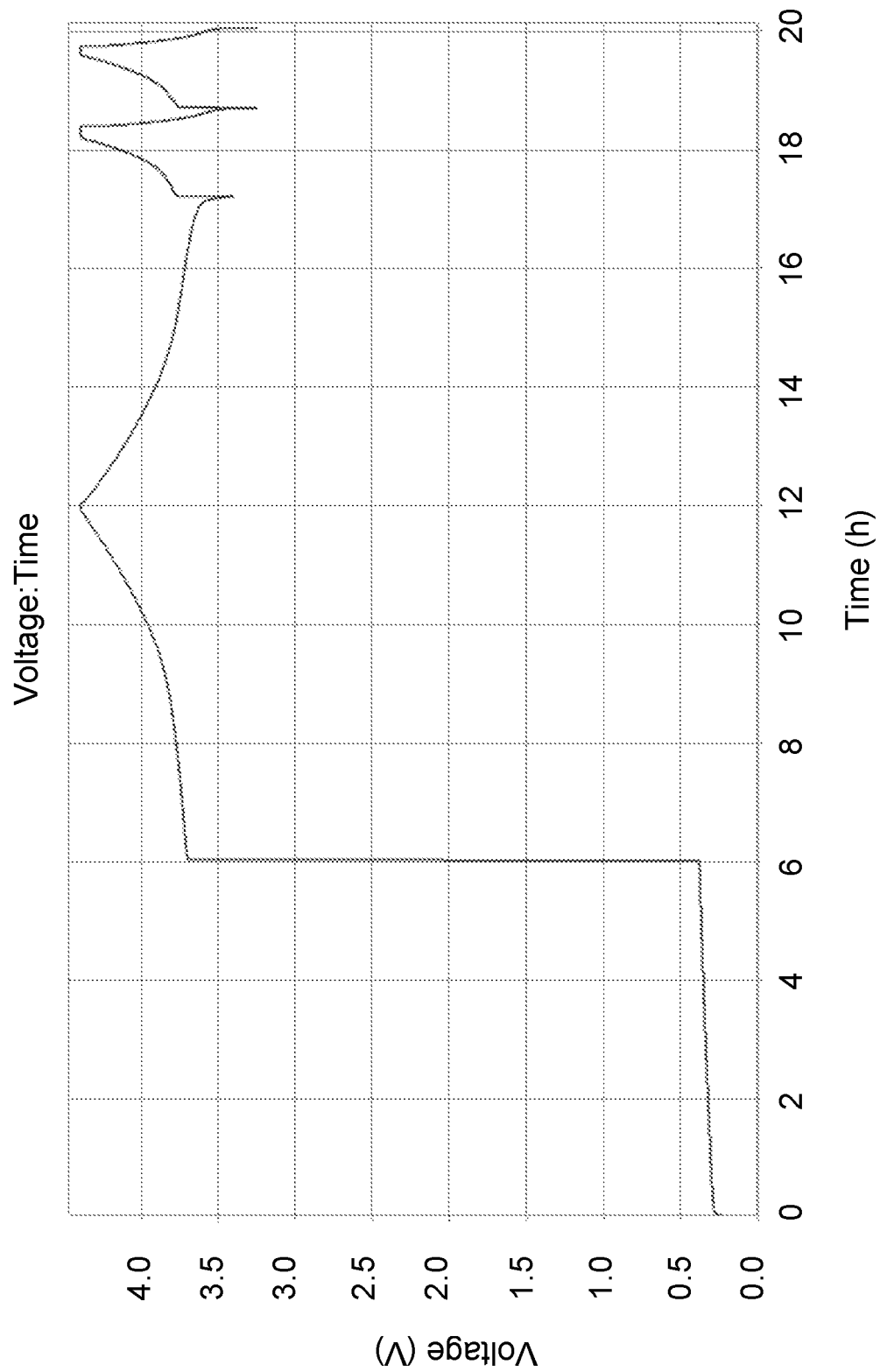
FIG. 4 shows a typical voltage profile of a cell having N/P ratio<0.1 in the discharged state manganese cobalt oxide-based cathode.

FIG. 4 shows a typical voltage profile of a cell containing an N/P ratio <0.1 in the discharged state. Upon assembly the cell open circuit potential (~0.3 V) is generally representative of the cathode electrode potential difference from that of the anode electrode substrate potential (e.g., Cu). Initiating cell charging corresponds to a rapid increase in cell potential as $Li^+$ transfers from the cathode to plate out upon the anode substrate, lowering that negative electrode potential to near −3 V vs. SHE. The corresponding cell potential jumps to about 3.8 V, and rises monotonically thereafter to charge cutoff at about 4.4 V. Thereafter discharge and charge can occur anywhere within this window as the anode electrode potential remains low due to the potential of the decomposition products upon the surface. This contains a lithium nickel manganese cobalt oxide cathode assembled vs. a copper negative electrode substrate and immersed in a lithium diflurooxolatoborate in ethylene carbonate and dimethyl carbonate-based electrolyte. All cycling was conducted at room temperature and cycle was conducted at C/5 while the subsequent cycling is 2C.

Example 3

Figure 5:
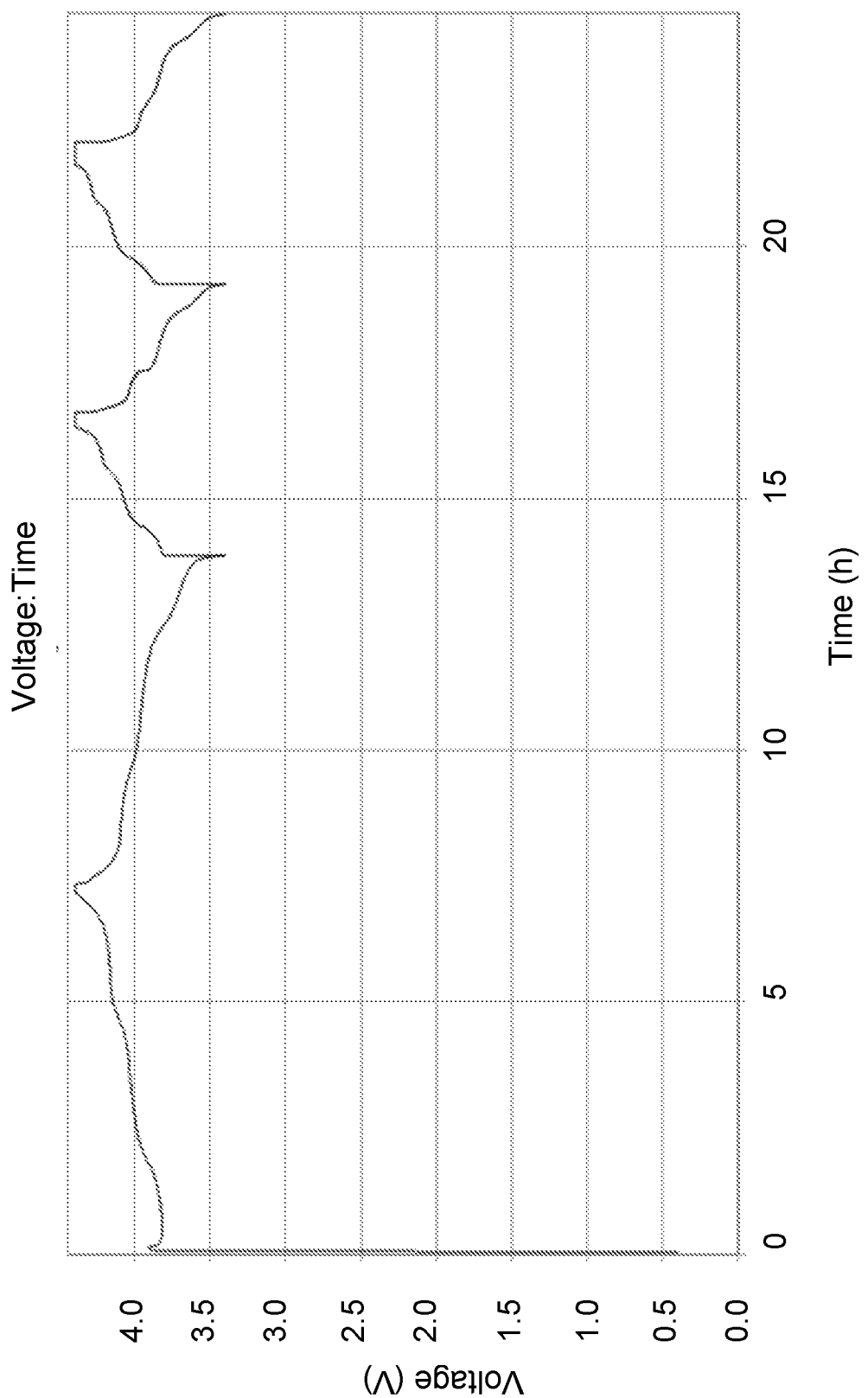
FIG. 5 shows a typical voltage profile of a high capacity transition metal oxide cell having N/P ratio<0.9 in the charged state.

FIG. 5 shows a typical voltage profile of a cell having N/P ratio<0.9 in the charged state. Herein we show the corresponding cell voltage profile for a cell containing a high capacity transition metal oxide wherein metal ions electrodeposit onto the negative electrode substrate during the initial charging. Thereafter the cell charges and discharges while plating and stripping the metal deposited from the cathode during the initial charge. This example shows a high capacity metal anode cell with an average voltage quite similar to that obtained by electrodepositing Li metal as depicted in FIG. 3.

FIG. 6-FIG. 9 show various characteristics of the presently disclosed cells, all constructed in a manner such that the Li metal anode is formed in-situ on the first charge of the cell by plating onto an inert current collector. The data for shown in FIG. 6 through FIG. 9 are for cells cycled at room temperature at a variety of charge and discharge rate combinations of commercial relevance.

Example 4

Figure 6:
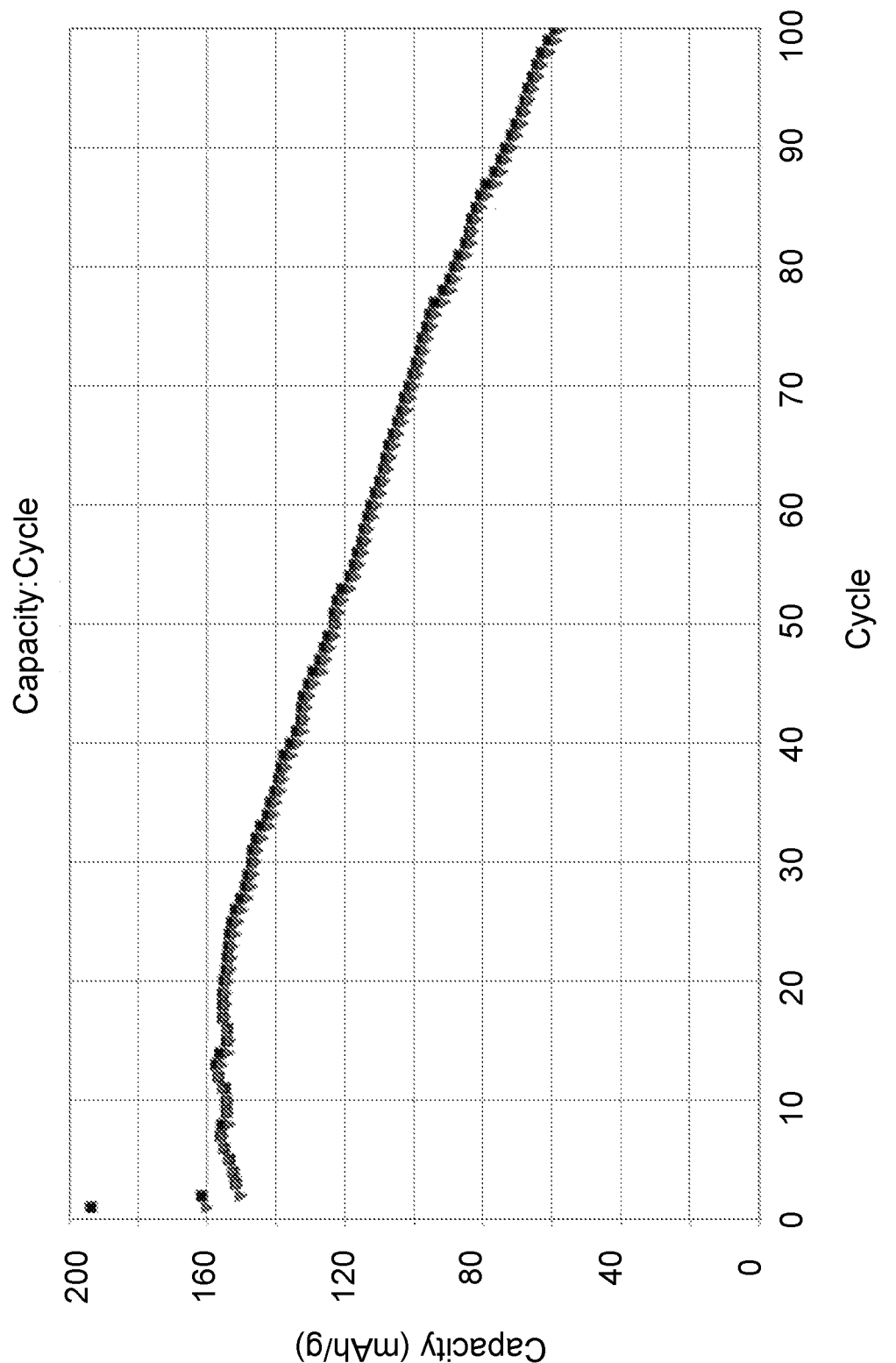
FIG. 6 shows a capacity fade plot from a 1.7 Ah multi-layer prismatic cell having an N/P ratio<0.9.

FIG. 6 shows a typical capacity fade plot for a multi-layer prismatic cell of about 1.7 Ah and N/P ratio<0.9. The plot shows the capacity fade as a function of the first 100 cycles based upon the normalized specific capacity of the lithium nickel manganese oxide cathode active material. The high purity and highly uniform metal deposit at the anode enables >33% capacity retention at cycle 100. The as-assembled construction is lithium nickel manganese oxide cathode vs. Cu negative electrode substrate, and as in FIG. 3, high purity Li metal electrodeposits at the negative electrode substrate upon initial charge. The rate of charge and discharge is C/2 and the cycling was conducted at room temperature.

Example 5

Figure 7:
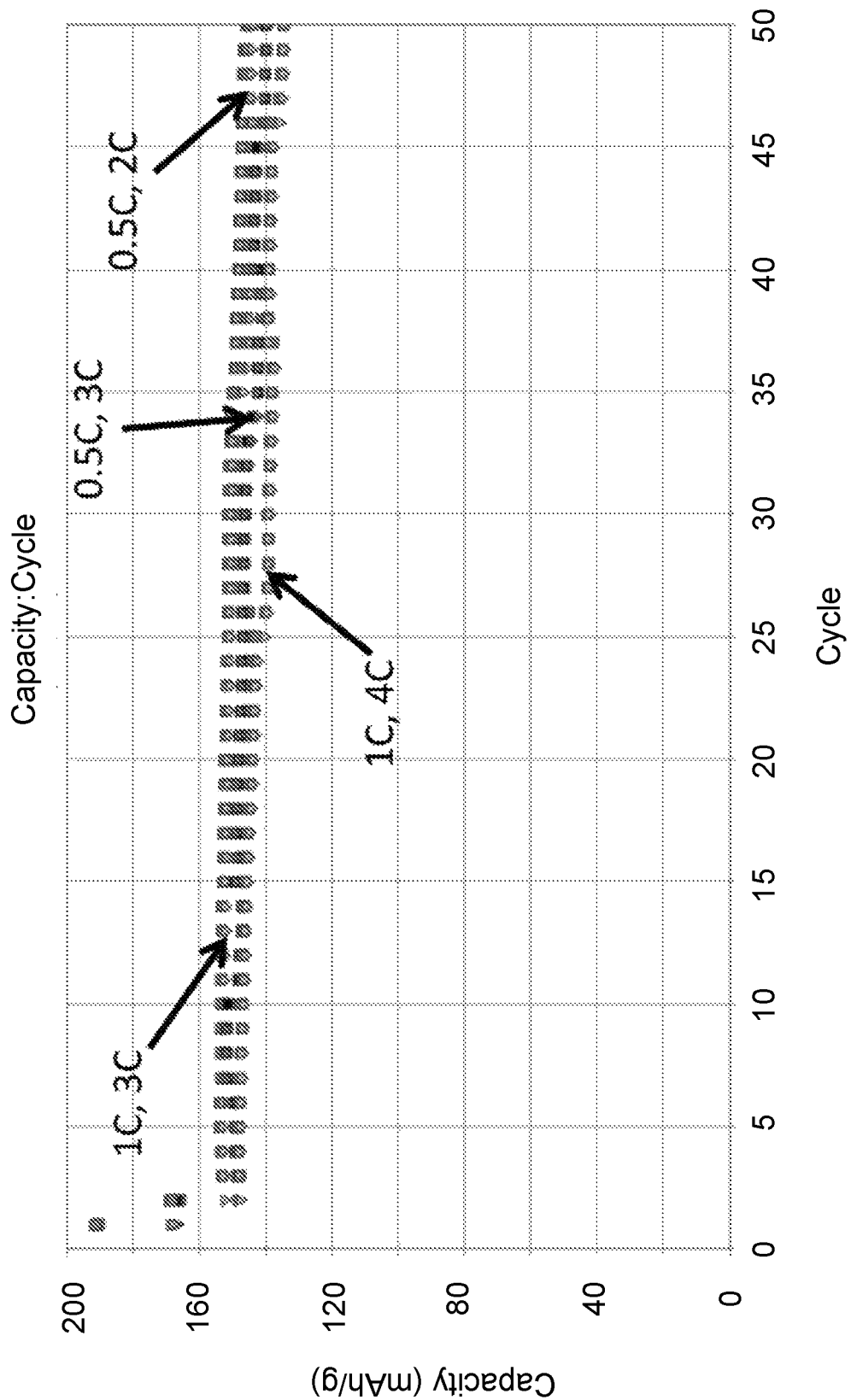
FIG. 7 is a capacity fade plot for lithium nickel manganese cobalt oxide cathode cells containing an N/P ratio<0.9 under a variety of rate conditions.

FIG. 7 contains a capacity fade plot for cells containing N/P ratio<0.9 under a variety of rate conditions. The plot shows the discharge capacity fade as a function of the first 50 cycles based upon the normalized specific capacity of the lithium nickel manganese cobalt oxide cathode active material. The as assembled construction is lithium nickel manganese cobalt oxide cathode vs. Cu negative electrode substrate, and as in FIG. 3, high purity Li metal electrodeposits at the negative electrode substrate upon initial charge. The cycling was conducted at room temperature and the C-rates depicted for charge/discharge are 0.5 C/3 C, 0.5 C/2

C, 1 C/3 C, 1 C/4 C (depicted as black to light grey trends). The capacity fade is generally invariant as a function of rate of charge and discharge.

Example 6

Figure 8:
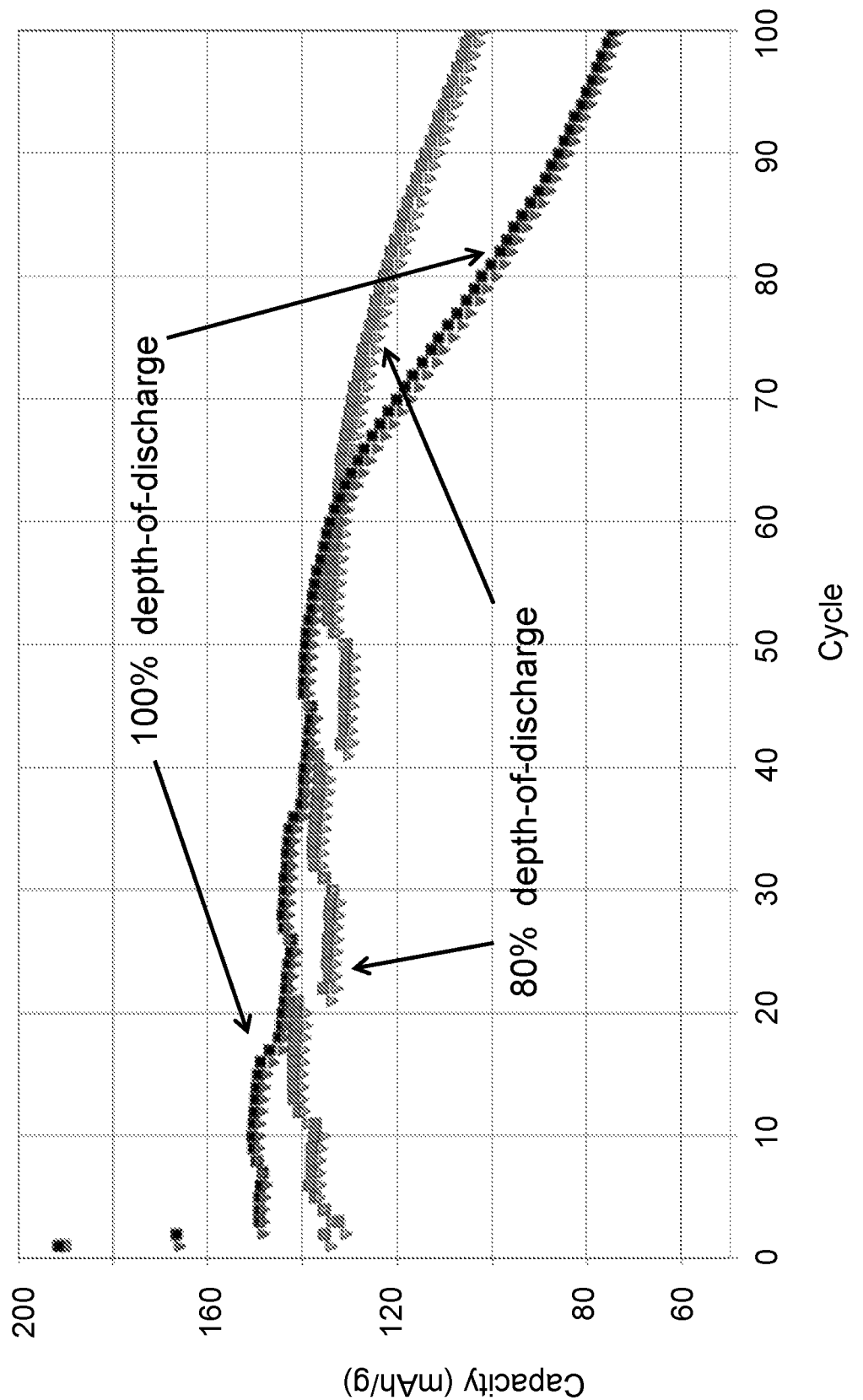
FIG. 8 shows capacity fade plot for cells containing an N/P ratio<0.9 as a function of Depth-of-Discharge conditions.

FIG. 8 contains a capacity fade plot for cells containing N/P ratio<0.9 comparing cells with 100% depth-of-discharge as compared to 87% depth-of-discharge. Significantly, the capacity loss for all cells in FIG. 8 is less than 10% over the number of cycles shown. The plot shows that the capacity fade can be suppressed by cycling at <100% depth of discharge. In this example, the negative electrode was the embodiment of the location in which the residing Li was stored. That is 100% of the cell's electroactive Li was electrodeposited at the anode during first charge after assembly and subsequently only 87% of that Li was cycled. The as assembled construction is lithium nickel manganese oxide cathode vs. Cu negative electrode substrate. The cycling was conducted at room temperature and the C-rates of formation were C/5 while subsequent cycling occurred at 2 C.

Example 7

Figure 9:
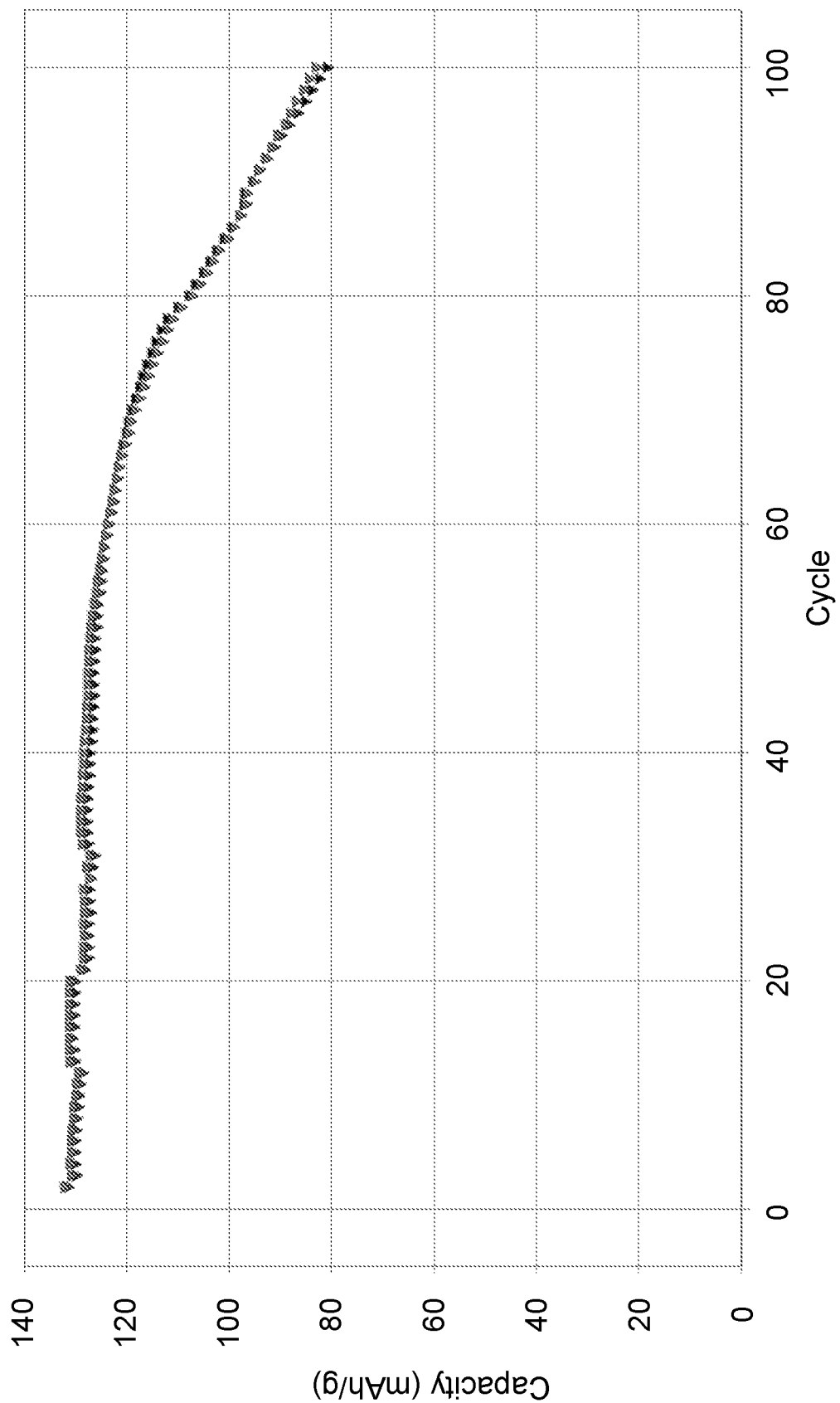
FIG. 9 shows capacity fade plot for cells containing an N/P ratio<0.9 as a function of cycle.

In a further example, the cells were also constructed to form the metallic lithium anode in-situ on the first charge cycle of the cell. The cells are cycled at room temperature and a rate of 1 C on charge and 3 C discharge. Significantly, the cells retain more than 60% of their original capacity after 100 cycles in stark contrast to expectation based on previous reports and the known literature. The capacity plot FIG. 9 shows the capacity fade as a function of the first 100 cycles based upon the normalized specific capacity of the lithium nickel manganese oxide cathode active material. The as assembled construction is lithium nickel manganese oxide cathode vs. Cu negative electrode substrate. As in FIG. 3, high purity Li metal electrodeposits at the negative electrode substrate upon initial charging. The cycling was conducted at room temperature and the C-rates depicted for charge:discharge are 1 C:3 C. The capacity retention is greater than 60% over 100 cycles.

According to principles of the present invention, in some embodiments the operating voltage of the anode (negative electrode) is held at 1 volt or less with respect the plating potential of a metal (examples are Mg, Li) using the absolute electrochemical scale.

The N/P ratio in different embodiments of the present invention can be in a range selected from the ranges of zero to 0.10, zero to 0.20, zero to 0.30, zero to 0.40, zero to 0.50, zero to 0.60, zero to 0.70, zero to 0.80, zero to 0.85, zero to 0.90, 0.05 to 0.10, 0.05 to 0.20, 0.05 to 0.30, 0.05 to 0.40, 0.05 to 0.50, 0.05 to 0.60, 0.05 to 0.70, 0.05 to 0.80, 0.05 to 0.85, and 0.05 to 0.90.

Materials of Construction

We now provide example fluid electrolytes that are expected to be suitable for secondary battery systems containing N/P ratio<0.9. In particular, materials contemplated for use in the electrolytes of the invention can be described by the general formula $Me_yX_z$, where Me is an electroactive metal cation of the secondary cell and X is a polyatomic monovalent negative ion. Examples of X polyatomic monovalent anions that are believed to be useful in practicing the invention include, but are not limited to, those described in Table I, and mixtures thereof. In some preferred embodiments Me is Mg, Li, or Na cation or mixtures thereof.

TABLE I

| Chemical name | Acronym | Formula |
|---|---|---|
| bis(perfluoroalkylsulfonyl)imides | | $N((C_xF_{2x+1})_xSO_2)_2^{-1}$ |
| bis(fluorosulfonyl)imide | FSI (x = 0) | $N(SO_2F)_2^{-1}$ |
| bis(trifluoromethanesulfonyl)imide | TFSI (x = 1) | $N(CF_3SO_2)_2^{-1}$ |
| bis(perfluoroethylsulfonyl)imide | BETI (x = 2) | $N(C_2F_5SO_2)_2^{-1}$ |
| Dicyanamide | DCA | $N(CN)_2^{-1}$ |
| Tricyanomethide | TCM | $C(CN)_3^{-1}$ |
| tetracyanoborate | TCB | $B(CN)_4^{-1}$ |
| 2,2,2,-trifluoro-N-(trifluoromethylsulfonyl)acetamide | | $N(CF_3SO_2)(CF_3CO)^{-1}$ |
| tetrafluoroborate | | $BF_4^{-1}$ |
| hexafluorophosphate | | $PF_6^{-1}$ |
| triflate | | $CF_3SO_3^{-1}$ |
| bis(oxalato)borate | BOB | $B(C_2O_4)_2^{-1}$ |
| difluoro(oxalato)borate | DFOB | $BF_2(C_2O_4)^{-1}$ |
| perchlorate | | $ClO_4^{-1}$ |
| hexafluoroarsenate | | $AsF_6^{-1}$ |
| Hexafluoroantimonate | | $SbF_6^{-1}$ |
| Perfluorobutylsulfonate | | $(C_4F_9SO_3)^{-1}$ |
| Tris(trifluoromethanesulfonyl)methide | | $C(CF_3SO_2)_3^{-1}$ |
| trifluoroacetate | | $CF_3CO_2^{-1}$ |
| heptafluorobutanoate | | $C_3F_7CO_2^{-1}$ |
| thiocyanate | | $SCN^{-1}$ |
| triflinate | | $CF_3SO_2^{-1}$ |

A variety of organic solvents are suitable for use in the electrolyte of the present invention. The organic solvents can be used alone or in combination. Whether a solvent comprises a single organic composition or a plurality of organic compositions, for the purposes of further exposition, the organic solvent will be referred to as "the solvent" in the singular. In order to provide for the reversible dissolution and plating of an electroactive metal, the solvent advantageously should provide appreciable solubility by coordination of the constituent inorganic salts of the electroactive metal. In various embodiments, suitable solvents include ethers, organic carbonates, and tertiary amines, and may also include, lactones, ketones, glymes, nitriles, ionic liquids, aliphatic and aromatic hydrocarbon solvents and organic nitro solvents. More specifically, suitable solvents include THF, 2-methyl THF, dimethoxyethane, diglyme, triglyme, tetraglyme, diethoxyethane, diethylether, proglyme, ethyl diglyme, butyl diglyme, ethylene carbonate, dimethyl carbonate, diethyl carbonate, dimethylsulfoxide, dimethylsulfite, sulfolane, ethyl methyl sulfone, acetonitrile, hexane, toluene, nitromethane, 1-3 dioxalane, 1-3 dioxane, 1-4 dioxane, trimethyl phosphate, tri-ethyl phosphate, hexa-methylphosphoramide (HMPA), N,N-propyl-methyl-pyrrolidinium-bis(trifluoromethylsulfonyl)imide (P13-TFSI), N,N-propyl-methyl-pyrrolidinium-diacetamide (P13-DCA), propyl-methyl-pyrrolidinium-bis(fluorosulfonyl)imide (P13-FSI), ethyl-dimethyl-propyl-ammonium-bis(trifluoromethylsulfonyl)imide (PDEA-TFSI), and 1-(methoxyethyl)-1-methylpiperidinium-bis(trifluoromethylsulfonyl) imide (MOEMPP-TFSI).

Intercalation cathodes used in conjunction with the electrolyte according to the present invention preferably include transition metal oxides, transition metal oxo-anions, chalcogenides, and halogenides and combinations thereof. Non-limiting examples of positive electrode active material for the Mg battery include Chevrel phase $Mo_6S_8$, $MnO_2$, CuS, $Cu_2S$, $Ag_2S$, $CrS_2$, $VOPO_4$, layered structure compounds such as $TiS_2$, $V_2O_5$, $MgVO_3$, $MoS_2$, $MgV_2O_5$, $MoO_3$, Spinel structured compounds such as $CuCr_2S_4$, $MgCr_2S_4$, $MgMn_2O_4$, $MgNiMnO_4$, $Mg_2MnO_4$, NASICON structured compounds such as $MgFe_2(PO_4)_3$ and $MgV_2(PO_4)_3$, Olivine structured compounds such as $MgMnSiO_4$ and $MgFe_2(PO_4)$ $_2$, Tavorite structured compounds such as $Mg_{0.5}VPO_4F$, pyrophosphates such as $TiP_2O_7$ and $VP_2O_7$, and fluorides such as $MgMnF_4$ and $FeF_3$. Non-limiting examples of positive electrode active materials for the Li battery include Lithium transition metal oxides comprised of one or more transition metals and one or more redox active transition metals such as Lithium Cobalt Oxide, Lithium Nickel Manganese Cobalt Oxide compositions, Lithium Nickel Cobalt Aluminum compositions. Non-limiting examples of positive electrode active materials for the Li battery include Lithium metal phosphates and tavorites such as LiFePO4, Lithium metal oxide spinels LiMn2O4, and Li NASICON's Li3V2(PO4)3.

In some embodiments, the positive electrode layer further comprises an electronically conductive additive. Non-limiting examples of electronically conductive additives include carbon black, Super P®, C-NERGY™ Super C65, Ensaco® black, Ketjenblack®, acetylene black, synthetic graphite such as Timrex® SFG-6, Timrex® SFG-15, Timrex® SFG-44, Timrex® KS-6, Timrex® KS-15, Timrex® KS-44, natural flake graphite, carbon nanotubes, fullerenes, hard carbon, or mesocarbon microbeads.

In some embodiments, the positive electrode layer further comprises a polymer binder. Non-limiting examples of polymer binders include poly-vinylidene fluoride (PVdF), poly(vinylidene fluoride-co-hexafluoropropene) (PVdF-HFP), Polytetrafluoroethylene (PTFE), Kynar Flex® 2801, Kynar® Powerflex LBG, and Kynar® HSV 900, or Teflon®.

Negative electrodes used in conjunction with the present invention comprise a negative electrode active material that can accept Mg-ions. Non-limiting examples of negative electrode active material for the Mg battery include Mg, Mg alloys. Magnesium alloys names are often given by two letters following by two numbers. Letters tell main alloying elements (e.g., A=aluminum, Z=zinc, M=manganese, S=silicon, K=zirconium, C=copper). Numbers indicate respective nominal compositions of main alloying elements. Marking AZ91 for example conveys magnesium alloy with roughly 9 weight percent aluminum and 1 weight percent zinc. Suitable alloys include those such as AZ31, AZ61, AZ63, AZ80, AZ81, AZ91, AM50, AM60, ZK51, ZK60, ZK61, ZC63, M1A, ZC71, Elektron® 21, Elektron® 675, Elektron®, Magnox (e.g., Magnesium non-oxidizing). Other suitable choices are insertion materials such as Anatase $TiO_2$, rutile $TiO_2$, $Mo_6S_8$, $FeS_2$, $TiS_2$, and $MoS_2$. Non-limiting examples of negative electrode active material for the Li battery Li, Li alloys such as Si, Sn, Bi, Al, Li4Ti5O12, hard carbon, graphitic carbon, amorphous carbon.

In some embodiments, the negative electrode layer further comprises an electronically conductive additive. Non-limiting examples of electronically conductive additives include carbon black, Super P®, C-NERGY™ Super C65, Ensaco® black, Ketjenblack®, acetylene black, synthetic graphite such as Timrex® SFG-6, Timrex® SFG-15, Timrex® SFG-44, Timrex® KS-6, Timrex® KS-15, Timrex® KS-44, natural flake graphite, carbon nanotubes, fullerenes, hard carbon, or mesocarbon microbeads.

In some embodiments, the negative electrode layer further comprises a polymer binder. Non-limiting examples of polymer binders include poly-vinylidene fluoride (PVdF), poly(vinylidene fluoride-co-hexafluoropropene) (PVdF-HFP), Polytetrafluoroethylene (PTFE), Kynar Flex® 2801, Kynar® Powerflex LBG, and Kynar® HSV 900, or Teflon®.

In some embodiments, the Mg, Li, or Na metal anode battery used in conjunction with the electrolyte described herein comprises a positive electrode current collector comprising carbonaceous material, or a current collector comprising a metal substrate coated with an over-layer to prevent corrosion in the electrolyte. In some embodiments, the Mg, Li, or Na battery described herein comprises a negative electrode current collector comprising any material capable of sufficiently conducting electrons. In other embodiments, the Mg, Li, or Na battery described herein comprises positive and negative electrode current collectors comprising any material capable of sufficiently conducting electrons.

In some embodiments, the Mg, Li, or Na battery disclosed herein is a button or coin cell battery comprising a stack of negative electrode, porous polypropylene or glass fiber separator, and positive electrode disks sit in a can base onto which the can lid is crimped. In other embodiments, the Mg, Li, or Na battery used in conjunction with the electrolyte disclosed herein is a stacked cell battery. In other embodiments, the Mg, Li, or Na battery disclosed herein is a prismatic, or pouch, cell comprising one or more stacks of negative electrode, porous polypropylene or glass fiber separator, and positive electrode sandwiched between current collectors wherein one or both current collectors comprise carbonaceous materials, or a metal substrate coated with an over-layer to prevent corrosion in the electrolyte. The stack(s) are folded within a polymer coated aluminum foil pouch, vacuum and heat dried, filled with electrolyte, and vacuum and heat sealed. In other embodiments, the Mg, Li, or Na battery disclosed herein is a prismatic, or pouch, bi-cell comprising one or more stacks of a positive electrode which is coated with active material on both sides and wrapped in porous polypropylene or glass fiber separator, and a negative electrode folded around the positive electrode wherein one or both current collectors comprise carbonaceous materials. The stack(s) are folded within a polymer coated aluminum foil pouch, dried under heat and/or vacuum, filled with electrolyte, and vacuum and heat sealed. In some embodiments of the prismatic or pouch cells used in conjunction with the electrolyte described herein, an additional tab composed of a metal foil or carbonaceous material of the same kind as current collectors described herein, is affixed to the current collector by laser or ultrasonic welding, adhesive, or mechanical contact, in order to connect the electrodes to the device outside the packaging.

In other embodiments, the Mg, Li, or Na battery used in conjunction with the electrolyte disclosed herein is a wound or cylindrical cell comprising wound layers of one or more stacks of a positive electrode which is coated with active material on one or both sides, sandwiched between layers of porous polypropylene or glass fiber separator, and a negative electrode wherein one or both current collectors comprise carbonaceous materials. The stack(s) are wound into cylindrical roll, inserted into the can, dried under heat and/or vacuum, filled with electrolyte, and vacuum and welded shut. In some embodiments of the cylindrical cells described herein, an additional tab composed of a metal foil or conducting material of the same kind as current collectors described herein, is affixed to the current collector by laser or ultrasonic welding, adhesive, or mechanical contact, in order to connect the electrodes to an external circuit outside the packaging.

In one embodiment, there is provided a rechargeable electrochemical cell wherein the negative electrode is not Lithium Titanate.

In another embodiment, there is provided a rechargeable electrochemical cell wherein the fluid electrolyte is not a molten salt.

Definitions

Unless otherwise explicitly recited herein, any reference to "secondary" or "rechargeable" cell is understood to refer to an electrochemical cell capable of undergoing repeated charge and discharge.

Unless otherwise explicitly recited herein, any reference to "capacity" is understood to refer to amp-hours provided by the cell or device under normal operating conditions.

Unless otherwise explicitly recited herein, any reference to "non-aqueous fluid electrolyte" is understood to refer to a non-aqueous liquid electrolyte or a non-aqueous gel electrolyte, and not to a molten salt electrolyte.

Unless otherwise explicitly recited herein, any reference to "current collector" is understood to refer to any material capable of sufficiently conducting electrons.

Unless otherwise explicitly recited herein, any reference to an electronic signal or an electromagnetic signal (or their equivalents) is to be understood as referring to a non-volatile electronic signal or a non-volatile electromagnetic signal.

Unless otherwise explicitly recited herein, any reference to "record" or "recording" is understood to refer to a non-volatile or non-transitory record or a non-volatile or non-transitory recording.

Recording the results from an operation or data acquisition, for example, recording results such as an electrical signal having a particular frequency or wavelength, or recording an image or a portion thereof, is understood to mean and is defined herein as writing output data in a non-volatile or non-transitory manner to a storage element, to a machine-readable storage medium, or to a storage device. Non-volatile or non-transitory machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A rechargeable electrochemical cell, comprising:
    a non-aqueous fluid electrolyte including one or more of the following solvents including ethers, tertiary amines, lactones, ketones, glymes, nitriles, aliphatic hydrocarbons, aromatic hydrocarbons, organic nitro solvents, THF, 2-methyl THF, dimethoxyethane, diglyme, triglyme, tetraglyme, diethoxyethane, diethylether, proglyme, ethyl diglyme, butyl diglyme, ethylene carbonate, dimethyl carbonate, diethyl carbonate, dimethylsulfoxide, dimethylsulfite, sulfolane, ethyl methyl sulfone, acetonitrile, hexane, toluene, nitromethane, 1-3 dioxalane, 1-3 dioxane, 1-4 dioxane, trimethyl phosphate, tri-ethyl phosphate and hexamethyl-phosphoramide (HMPA), and the non-aqueous fluid electrolyte including an active cation;
    a negative electrode having a first active surface in direct physical contact with said non-aqueous fluid electrolyte, wherein said negative electrode is configured to provide >1000 mAh/cc;
    a positive electrode having a second active surface in direct physical contact with non-aqueous fluid electrolyte; and
    an electronically insulating separator configured to separate said negative electrode and said positive electrode;
    said negative electrode and said positive electrode configured such that the capacity of said negative electrode is strictly less than the capacity of said positive electrode, and also greater than zero,
    wherein said first active surface is not coated with a reduced form of the active cation and is configured to form a coating while the rechargeable electrochemical cell is initially charged.

2. The rechargeable electrochemical cell of claim 1, wherein a ratio of reversible capacity between said negative electrode and said positive electrode is such that Q(negative electrode)/Q(positive electrode)<0.9 and Q(negative electrode)/Q(positive electrode)>0.

3. The rechargeable electrochemical cell of claim 1, wherein the electrochemical cell is configured for an average discharge potential of greater than or equal to 3.80 V during a 0.2 C-rate discharge.

4. The rechargeable electrochemical cell of claim 1, configured to charge and discharge with >99.35% Coulombic efficiency.

5. The rechargeable electrochemical cell of claim 1, configured to provide at least 80% of initial capacity for greater than 30 charging and discharging cycles.

6. The lithium electrochemical cell of claim 1, wherein said negative electrode is configured to provide less than or equal to 3 mAh/cm$^2$ of electro-active material in the discharged state.

7. The lithium electrochemical cell of claim 1, wherein said negative electrode is configured to provide greater than or equal to 3 mAh/cm$^2$ of electro-active material in the charged state.

8. The rechargeable electrochemical cell of claim 1, wherein said active cation comprises at least one cation selected from the group consisting of Mg ion, Al ion, Ca ion, Sr ion, Ba ion, Li ion, Na ion, K ion, Rb ion, Cs ion, and onium.

9. The rechargeable electrochemical cell of claim 1, wherein said non-aqueous fluid electrolyte further comprises an anion at least in part from one or more of the following anions: bis(perfluoroalkylsulfonyl)imides, bis(fluorosulfonyl)imide, bis(trifluoromethanesulfonyl)imide, bis(perfluoroethylsulfonyl)imide, Dicyanamide, Tricyanomethide, tetracyanoborate, 2,2,2,-trifluoro-N-(trifluoromethylsulfonyl)acetamide, tetrafluoroborate, hexafluorophosphate, triflate, bis(oxalato)borate, difluoro(oxalato)borate, perchlorate, hexafluoroarsenate, Hexafluoroantimonate, Perfluorobutylsulfonate, Tris(trifluoromethanesulfonyl)methide, trifluoroacetate, heptafluorobutanoate, thiocyanate, or triflinate.

10. The rechargeable electrochemical cell of claim 1, wherein the non-aqueous fluid electrolyte includes one or more salts, and said one or more salts comprise at least three elements and include two or more of the following: boron, phosphorous, fluorine, carbon, nitrogen, sulfur, and oxygen.

11. The rechargeable electrochemical cell of claim 1, comprising an electrolyte component including in part a polymer, a liquid, a gel, or solid electrolyte.

12. The rechargeable electrochemical cell of claim 1, wherein said non-aqueous fluid electrolyte comprises a salt, or combination of salts in a concentration in the range of 0.5 M to saturated concentration.

13. The rechargeable electrochemical cell of claim 1, wherein at least one of said negative electrode or positive electrode comprises at least one metal selected from the group consisting of Mg, Li, or Na, an alloy thereof, or an intermetallic compound thereof, which is configured to plate onto a negative electrode current collector during charging.

14. The rechargeable electrochemical cell of claim 1, wherein at least one of said negative electrode or positive electrode comprises a material configured to undergo an insertion reaction, an alloying, an intercalation, a disproportionation, a conversion reaction, or a combination thereof.

15. The rechargeable electrochemical cell of claim 1, wherein a pressure perpendicular to the interface of the positive and negative electrodes is greater than 0.06 MPa.

16. A rechargeable electrochemical cell of claim 1 wherein the negative electrode is not comprised at least in part of a lithium titanium oxide compound.

17. A rechargeable electrochemical cell of claim 1 wherein the non-aqueous electrolyte is a fluid electrolyte and does not comprise a molten salt.

18. The rechargeable electrochemical cell of claim 1, wherein a ratio defined by said capacity of said negative electrode divided by said capacity of said positive electrode is in a range selected from the ranges of zero to 0.10, zero to 0.20, zero to 0.30, zero to 0.40, zero to 0.50, zero to 0.60, zero to 0.70, zero to 0.80, and zero to 0.90, wherein each range excludes exactly zero.

19. The rechargeable electrochemical cell of claim 1, wherein a ratio defined by said capacity of said negative electrode divided by said capacity of said positive electrode is in a range selected from the ranges of 0.05 to 0.10, 0.05 to 0.20, 0.05 to 0.30, 0.05 to 0.40, 0.05 to 0.50, 0.05 to 0.60, 0.05 to 0.70, 0.05 to 0.80, and 0.05 to 0.90.

20. A battery comprising more than one of the rechargeable electrochemical cells of claim 1 configured in combination of series and parallel electrical connection to provide electrical power to a device.

* * * * *